US009232077B2

(12) United States Patent
Yu et al.

(10) Patent No.: US 9,232,077 B2
(45) Date of Patent: *Jan. 5, 2016

(54) AUTOMATIC SUBSCRIPTION SYSTEM FOR APPLICATIONS AND SERVICES PROVIDED TO WIRELESS DEVICES

(75) Inventors: Julie Yu, San Diego, CA (US); Gerald Horel, Brentwood Bay (CA); Jaiteerth Patwari, San Diego, CA (US); Michelle Klein, San Diego, CA (US); Mitchell Oliver, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1244 days.

This patent is subject to a terminal disclaimer.

(21) Appl. No.: 10/388,063

(22) Filed: Mar. 12, 2003

(65) Prior Publication Data

US 2004/0181591 A1    Sep. 16, 2004

(51) Int. Cl.
*G06F 15/16* (2006.01)
*H04M 15/00* (2006.01)
*G06Q 20/14* (2012.01)
(Continued)

(52) U.S. Cl.
CPC ............ *H04M 15/44* (2013.01); *G06Q 20/145* (2013.01); *G06Q 20/16* (2013.01); *H04L 12/14* (2013.01); *H04L 12/1439* (2013.01); *H04L 12/1457* (2013.01); *H04L 29/06* (2013.01); *H04L 67/04* (2013.01); *H04L 67/22* (2013.01); *H04L 67/306* (2013.01); *H04M 15/68* (2013.01); *H04M 15/8005* (2013.01); *H04M 17/00* (2013.01); *H04W 4/00* (2013.01); *H04L 69/329* (2013.01); *H04M 2215/0104* (2013.01);
(Continued)

(58) Field of Classification Search
USPC ...................... 705/1, 26, 40, 52; 709/217, 203
See application file for complete search history.

(56) References Cited

U.S. PATENT DOCUMENTS 628,294 A    7/1899   Ira
4,528,589 A  7/1985   Block et al.
(Continued)

FOREIGN PATENT DOCUMENTS

CA    2267549 A1    9/2000
CA    2363220 A1    5/2003
(Continued)

OTHER PUBLICATIONS

M2 Presswire, CONVERGYS: Genie Mobile chooses Geneva Billing software, continuing the momentum of the merger between Convergys and Geneva Technology Coventry: Jun. 1, 2001, p. 1.
(Continued)

*Primary Examiner* — Thomas Dailey
(74) *Attorney, Agent, or Firm* — Robert J. O'Connell; Satheesh Karra

(57) ABSTRACT

A system, method, and computer program that automatically creates a subscription for applications and services provided to wireless devices from other computer devices on a wireless network, where the subscription requires periodic payment by the wireless device subscriber for continued access to the application or service. The system monitors wireless device end-user interaction with other computer devices, such as application download servers, across the wireless network and when the end-user obtains an application or service from the computer device, the system automatically records the subscription and can either bill the wireless device subscriber for the subscription(s) or transmit the bill to the carrier or other entity to bill the subscriber.

77 Claims, 9 Drawing Sheets

US 9,232,077 B2

Page 2

(51) Int. Cl.
- *G06Q 20/16* (2012.01)
- *H04L 12/14* (2006.01)
- *H04L 29/06* (2006.01)
- *H04M 17/00* (2006.01)
- *H04W 4/00* (2009.01)
- *H04L 29/08* (2006.01)
- *H04W 4/24* (2009.01)
- *H04W 74/00* (2009.01)

(52) U.S. Cl.
CPC .. *H04M 2215/0196* (2013.01); *H04M 2215/32* (2013.01); *H04W 4/24* (2013.01); *H04W 74/00* (2013.01)

(56) References Cited

U.S. PATENT DOCUMENTS

| | | | | |
|---|---|---|---|---|
| 4,975,942 | A | 12/1990 | Zebryk | |
| 5,013,897 | A | 5/1991 | Harman et al. | |
| 5,608,781 | A | 3/1997 | Seiderman | |
| 5,666,293 | A | 9/1997 | Metz et al. | |
| 5,666,397 | A | 9/1997 | Lamons et al. | |
| 5,845,267 | A | 12/1998 | Ronen | |
| 5,852,812 | A | 12/1998 | Reeder | |
| 6,014,641 | A | 1/2000 | Loeb et al. | |
| 6,035,281 | A | 3/2000 | Crosskey et al. | |
| 6,047,051 | A | 4/2000 | Ginzboorg et al. | |
| 6,088,717 | A | 7/2000 | Reed et al. | |
| 6,141,404 | A | 10/2000 | Westerlage et al. | |
| 6,185,198 | B1 | 2/2001 | LaDue | |
| 6,202,051 | B1 | 3/2001 | Woolston | |
| 6,226,618 | B1 | 5/2001 | Downs et al. | |
| 6,253,189 | B1 | 6/2001 | Feezell et al. | |
| 6,263,326 | B1 | 7/2001 | Chandra | |
| 6,266,401 | B1 | 7/2001 | Marchbanks et al. | |
| 6,269,157 | B1 | 7/2001 | Coyle | |
| 6,282,294 | B1* | 8/2001 | Deo et al. | 380/270 |
| 6,321,078 | B1 | 11/2001 | Menelli et al. | |
| 6,324,565 | B1 | 11/2001 | Holt, III | |
| 6,327,574 | B1 | 12/2001 | Kramer et al. | |
| 6,334,114 | B1 | 12/2001 | Jacobs et al. | |
| 6,334,116 | B1 | 12/2001 | Ganesan et al. | |
| 6,343,318 | B1 | 1/2002 | Hawkins et al. | |
| 6,366,893 | B2 | 4/2002 | Hannula et al. | |
| 6,389,464 | B1 | 5/2002 | Krishnamurthy et al. | |
| 6,427,076 | B2* | 7/2002 | Skog | 455/433 |
| 6,434,535 | B1 | 8/2002 | Kupka et al. | |
| 6,493,722 | B1 | 12/2002 | Daleen et al. | |
| 6,528,934 | B1 | 3/2003 | Chen et al. | |
| 6,549,770 | B1 | 4/2003 | Marran | |
| 6,597,903 | B1 | 7/2003 | Dahm et al. | |
| 6,598,026 | B1 | 7/2003 | Ojha et al. | |
| 6,622,017 | B1 | 9/2003 | Hoffman | |
| 6,665,711 | B1 | 12/2003 | Boyle et al. | |
| 6,704,716 | B1 | 3/2004 | Force | |
| 6,741,980 | B1* | 5/2004 | Langseth et al. | 707/2 |
| 6,754,320 | B2 | 6/2004 | Daase et al. | |
| 6,792,271 | B1* | 9/2004 | Sherman et al. | 455/432.1 |
| 6,816,721 | B1 | 11/2004 | Rudisill | |
| 6,820,121 | B1 | 11/2004 | Callis et al. | |
| 6,937,996 | B1 | 8/2005 | Forsythe et al. | |
| 6,941,139 | B1 | 9/2005 | Shupe et al. | |
| 6,941,270 | B1 | 9/2005 | Hannula | |
| 6,955,883 | B2 | 10/2005 | Margus et al. | |
| 6,957,793 | B2 | 10/2005 | Gautier et al. | |
| 6,965,883 | B2 | 11/2005 | Xu et al. | |
| 6,985,882 | B1 | 1/2006 | Del Sesto | |
| 7,010,500 | B2* | 3/2006 | Aarnio | 705/26 |
| 7,013,289 | B2 | 3/2006 | Horn et al. | |
| 7,043,447 | B2* | 5/2006 | Hughes et al. | 705/26 |
| 7,047,405 | B2 | 5/2006 | Mauro | |
| 7,068,680 | B1 | 6/2006 | Kaltenmark et al. | |
| 7,113,766 | B2 | 9/2006 | Horel et al. | |
| 7,184,747 | B2 | 2/2007 | Bogat | |
| 7,200,566 | B1 | 4/2007 | Moore et al. | |
| 7,218,917 | B2 | 5/2007 | Pradhan et al. | |
| 7,260,194 | B1 | 8/2007 | Meyers et al. | |
| 7,286,655 | B2 | 10/2007 | Voorman et al. | |
| 7,293,099 | B1 | 11/2007 | Kalajan | |
| 7,362,745 | B1 | 4/2008 | Cope et al. | |
| 7,415,439 | B2 | 8/2008 | Kontio et al. | |
| 7,436,816 | B2* | 10/2008 | Mehta et al. | 370/352 |
| 7,467,198 | B2 | 12/2008 | Goodman et al. | |
| 7,490,045 | B1 | 2/2009 | Flores et al. | |
| 7,526,450 | B2* | 4/2009 | Hughes et al. | 705/51 |
| 7,574,377 | B2 | 8/2009 | Carapelli | |
| 7,577,616 | B2 | 8/2009 | Zhu | |
| 7,583,953 | B2 | 9/2009 | Choi et al. | |
| 7,660,755 | B2 | 2/2010 | Amato et al. | |
| 7,711,680 | B2 | 5/2010 | Barnes-Leon et al. | |
| 7,752,217 | B2 | 7/2010 | Sawashima et al. | |
| 7,894,803 | B2 | 2/2011 | Kamada | |
| 7,904,528 | B2 | 3/2011 | Zilliacus et al. | |
| 7,907,937 | B2 | 3/2011 | Engelhart | |
| 8,028,056 | B1 | 9/2011 | Krishna et al. | |
| 8,150,736 | B2 | 4/2012 | Horn et al. | |
| 8,489,470 | B2 | 7/2013 | Kahlon et al. | |
| 2001/0013020 | A1* | 8/2001 | Yoshida et al. | 705/50 |
| 2001/0032254 | A1 | 10/2001 | Hawkins | |
| 2001/0034686 | A1 | 10/2001 | Eder | |
| 2001/0056362 | A1 | 12/2001 | Hanagan et al. | |
| 2002/0002603 | A1 | 1/2002 | Vange | |
| 2002/0004935 | A1* | 1/2002 | Huotari et al. | 717/11 |
| 2002/0019764 | A1 | 2/2002 | Mascarenhas | |
| 2002/0022472 | A1 | 2/2002 | Watler et al. | |
| 2002/0022971 | A1 | 2/2002 | Tanaka et al. | |
| 2002/0029197 | A1* | 3/2002 | Kailamaki et al. | 705/40 |
| 2002/0035688 | A1 | 3/2002 | Kutaragi et al. | |
| 2002/0035699 | A1* | 3/2002 | Crosbie | 713/201 |
| 2002/0038369 | A1 | 3/2002 | Sung et al. | |
| 2002/0052754 | A1* | 5/2002 | Joyce et al. | 705/1 |
| 2002/0069176 | A1 | 6/2002 | Newman | |
| 2002/0069244 | A1 | 6/2002 | Blair et al. | |
| 2002/0069263 | A1* | 6/2002 | Sears et al. | 709/218 |
| 2002/0071559 | A1 | 6/2002 | Christensen et al. | |
| 2002/0107706 | A1 | 8/2002 | Oliver et al. | |
| 2002/0107809 | A1* | 8/2002 | Biddle et al. | 705/59 |
| 2002/0109706 | A1 | 8/2002 | Lincke et al. | |
| 2002/0123984 | A1 | 9/2002 | Prakash | |
| 2002/0131401 | A1 | 9/2002 | Ehreth | |
| 2002/0131404 | A1* | 9/2002 | Mehta et al. | 370/352 |
| 2002/0160752 | A1* | 10/2002 | Hook et al. | 455/412 |
| 2002/0165822 | A1* | 11/2002 | Makipaa | 705/40 |
| 2002/0176553 | A1 | 11/2002 | Aschir | |
| 2003/0005136 | A1 | 1/2003 | Eun | |
| 2003/0023550 | A1 | 1/2003 | Lee | |
| 2003/0028903 | A1* | 2/2003 | Hofrichter et al. | 725/151 |
| 2003/0033209 | A1 | 2/2003 | Minear et al. | 705/26 |
| 2003/0046396 | A1 | 3/2003 | Richter et al. | |
| 2003/0051047 | A1 | 3/2003 | Horel et al. | |
| 2003/0060188 | A1 | 3/2003 | Gidron et al. | |
| 2003/0074328 | A1 | 4/2003 | Schiff et al. | |
| 2003/0078844 | A1 | 4/2003 | Takatori et al. | |
| 2003/0078886 | A1 | 4/2003 | Minear et al. | |
| 2003/0078895 | A1 | 4/2003 | MacKay | |
| 2003/0093461 | A1 | 5/2003 | Suzuki et al. | |
| 2003/0110044 | A1* | 6/2003 | Nix et al. | 705/1 |
| 2003/0110213 | A1 | 6/2003 | Munetsugu et al. | |
| 2003/0112927 | A1 | 6/2003 | Brown et al. | 379/67.1 |
| 2003/0120594 | A1 | 6/2003 | Shaginaw et al. | |
| 2003/0149958 | A1 | 8/2003 | Baluja et al. | |
| 2003/0151621 | A1* | 8/2003 | McEvilly et al. | 345/744 |
| 2003/0208444 | A1 | 11/2003 | Sauer | |
| 2003/0233329 | A1* | 12/2003 | Laraki et al. | 705/52 |
| 2003/0236867 | A1 | 12/2003 | Natsuno et al. | |
| 2004/0006517 | A1 | 1/2004 | Takatori | |
| 2004/0015413 | A1* | 1/2004 | Abu-Hejleh et al. | 705/26 |
| 2004/0030601 | A1 | 2/2004 | Pond et al. | |
| 2004/0043753 | A1* | 3/2004 | Wake et al. | 455/406 |
| 2004/0044623 | A1* | 3/2004 | Wake et al. | 705/40 |
| 2004/0137890 | A1* | 7/2004 | Kalke | 455/418 |
| 2004/0139012 | A1 | 7/2004 | Koskinen et al. | |
| 2004/0267630 | A1 | 12/2004 | Au et al. | |
| 2005/0086348 | A1 | 4/2005 | Balassanian | |

(56) References Cited

U.S. PATENT DOCUMENTS

| | | |
|---|---|---|
| 2005/0090258 A1 | 4/2005 | Coppinger et al. |
| 2005/0113092 A1 | 5/2005 | Coppinger et al. |
| 2005/0125315 A1 | 6/2005 | Munoz et al. |
| 2005/0132049 A1 | 6/2005 | Inoue et al. |
| 2005/0148319 A1 | 7/2005 | Himeno |
| 2005/0192878 A1 | 9/2005 | Minear et al. |
| 2005/0289047 A1 | 12/2005 | Oliver et al. |
| 2006/0014535 A1 | 1/2006 | Walker et al. |
| 2006/0080232 A1 | 4/2006 | Epps |
| 2006/0173758 A1 | 8/2006 | Minear et al. |
| 2006/0235931 A1 | 10/2006 | Ruthe et al. |
| 2006/0270386 A1 | 11/2006 | Yu et al. |
| 2006/0271449 A1 | 11/2006 | Oliver et al. |
| 2007/0003034 A1 | 1/2007 | Schultz et al. |
| 2007/0066279 A1 | 3/2007 | Silverbrook et al. |
| 2007/0083464 A1 | 4/2007 | Cordero Torres et al. |
| 2007/0123229 A1 | 5/2007 | Pousti |
| 2007/0174308 A1 | 7/2007 | Rausch |
| 2007/0197188 A1 | 8/2007 | Sprigg et al. |
| 2007/0197189 A1 | 8/2007 | Horel et al. |
| 2011/0030042 A1 | 2/2011 | Neal-Joslin |
| 2011/0143709 A1 | 6/2011 | Pousti |
| 2012/0309345 A1 | 12/2012 | Wake et al. |

FOREIGN PATENT DOCUMENTS

| | | |
|---|---|---|
| CN | 1459183 A | 11/2003 |
| EP | 0780802 A2 | 6/1997 |
| EP | 1026610 A2 | 8/2000 |
| EP | 1026853 | 8/2000 |
| EP | 1033652 | 9/2000 |
| EP | 1047030 A2 | 10/2000 |
| EP | 1122967 A2 | 8/2001 |
| EP | 1204054 A2 | 5/2002 |
| EP | 1403797 A1 | 3/2004 |
| EP | 1404100 A1 | 3/2004 |
| EP | 1414185 A2 | 4/2004 |
| JP | 07044261 | 2/1995 |
| JP | 07319691 A | 12/1995 |
| JP | 1066050 | 3/1998 |
| JP | 10140283 A | 5/1998 |
| JP | 10262059 A | 9/1998 |
| JP | 11053185 A | 2/1999 |
| JP | 11055252 A | 2/1999 |
| JP | 11126188 A | 5/1999 |
| JP | 2000078129 A | 3/2000 |
| JP | 2000505568 A | 5/2000 |
| JP | 2000357196 A | 12/2000 |
| JP | 2001195451 A | 7/2001 |
| JP | 2001202434 A | 7/2001 |
| JP | 2001243382 A | 9/2001 |
| JP | 2001250069 A | 9/2001 |
| JP | 2001265938 | 9/2001 |
| JP | 2001268623 A | 9/2001 |
| JP | 2001312666 A | 11/2001 |
| JP | 2001319168 A | 11/2001 |
| JP | 2001325234 | 11/2001 |
| JP | 2001352583 | 12/2001 |
| JP | 2002007839 A | 1/2002 |
| JP | 2002015160 A | 1/2002 |
| JP | 2002093361 A | 3/2002 |
| JP | 2002094450 A | 3/2002 |
| JP | 2002101315 A | 4/2002 |
| JP | 2002109395 A | 4/2002 |
| JP | 2002132367 | 5/2002 |
| JP | 2002133316 A | 5/2002 |
| JP | 2002163258 | 6/2002 |
| JP | 2002163467 A | 6/2002 |
| JP | 2002197294 | 7/2002 |
| JP | 2002245350 A | 8/2002 |
| JP | 2002279103 A | 9/2002 |
| JP | 2002329249 A | 11/2002 |
| JP | 2002335336 | 11/2002 |
| JP | 2002345030 A | 11/2002 |
| JP | 2002353885 A | 12/2002 |
| JP | 2003016041 A | 1/2003 |
| JP | 2003016093 | 1/2003 |
| JP | 2003518885 A | 6/2003 |
| JP | 2003187083 A | 7/2003 |
| JP | 2004004157 A | 1/2004 |
| JP | 2004005044 A | 1/2004 |
| JP | 2004135229 A | 4/2004 |
| JP | 2004185197 | 7/2004 |
| JP | 2004220546 | 8/2004 |
| JP | 3609398 | 1/2005 |
| JP | 2005078325 A | 3/2005 |
| JP | 2005519407 A | 6/2005 |
| JP | 2005198021 A | 7/2005 |
| JP | 2005537544 | 12/2005 |
| JP | 2006505966 A | 2/2006 |
| JP | 2007527570 A | 9/2007 |
| JP | 2008514743 A | 5/2008 |
| JP | 2010178027 A | 8/2010 |
| KR | 20010078968 | 8/2001 |
| KR | 20020039648 | 5/2002 |
| KR | 102003005056 | 6/2003 |
| KR | 20030078446 | 10/2003 |
| KR | 20070007954 | 1/2007 |
| RU | 2212057 | 9/2003 |
| TW | 161301 | 6/1991 |
| TW | 388021 | 4/2000 |
| TW | 466858 | 12/2001 |
| TW | 499645 | 8/2002 |
| WO | WO-9703410 A1 | 1/1997 |
| WO | WO-9726739 A1 | 7/1997 |
| WO | WO9821676 | 5/1998 |
| WO | 9931610 | 6/1999 |
| WO | WO-9941861 A1 | 8/1999 |
| WO | WO-0002112 A2 | 1/2000 |
| WO | WO0031672 A1 | 6/2000 |
| WO | WO-0043962 A1 | 7/2000 |
| WO | WO-0143390 A2 | 6/2001 |
| WO | 0150305 A2 | 7/2001 |
| WO | WO-0149048 A1 | 7/2001 |
| WO | WO0163532 | 8/2001 |
| WO | WO-0163900 A1 | 8/2001 |
| WO | 0169891 | 9/2001 |
| WO | 0197104 | 12/2001 |
| WO | WO-0203219 A1 | 1/2002 |
| WO | WO0244892 | 6/2002 |
| WO | 02063537 | 8/2002 |
| WO | 02067600 | 8/2002 |
| WO | WO02063536 A2 | 8/2002 |
| WO | WO-02073934 A2 | 9/2002 |
| WO | WO-02093361 A1 | 11/2002 |
| WO | WO-02103459 A2 | 12/2002 |
| WO | WO-03032618 A1 | 4/2003 |
| WO | WO-03050743 A1 | 6/2003 |
| WO | 03075584 A2 | 9/2003 |
| WO | 03079256 A1 | 9/2003 |
| WO | WO-03085943 A1 | 10/2003 |
| WO | WO-2004003708 A2 | 1/2004 |
| WO | WO2004021131 A2 | 3/2004 |
| WO | 2004084526 A2 | 9/2004 |
| WO | 2005008383 A2 | 1/2005 |
| WO | WO2005020027 A2 | 3/2005 |
| WO | WO-2005069917 | 8/2005 |
| WO | WO-2006130539 A2 | 12/2006 |

OTHER PUBLICATIONS

PR Newswire, China Unicom Selects QUALCOMM's Brew Solution as its Platform to Launch Wireless Data Applications, New York, Aug. 26, 2002, p. 1.
International Search Report—PCT/US03/02714, International Search Authority—US, Mar. 1, 2004.
International Preliminary Examination Report—PCT/US03/27014, IPEA/US—Apr. 29, 2004.
Supplemental European Search Report—EP03749189, Search Authority—The Hague, Apr. 22, 2006.
Amendment dated Oct. 14, 2008, U.S. Appl. No. 11/141,934.
Amendment dated Aug. 8, 2007, U.S. Appl. No. 11/141,807.

(56) References Cited

OTHER PUBLICATIONS

Amendment dated Dec. 23, 2007, U.S. Appl. No. 11/141,807.
Anonymous, "BPM in Action: iUNIVERSE," Intelligent Enterprise, San Mateo, May 15, 2004, vol. 7, Issue 8, 2 pages (recovered from ProQuest on Jun. 5, 2009).
Diebold Teams with Health System Services to Offer a Complete Distribution Package for Pharmacy Medication and Supplies PR Newswire. New York: May 28, 1998. p. 1.
Fujii, H. "BREW application, flexibility in development comparable to PCs, powerful in enterprise system cooperation of cellular phones," Solution IT, vol. 14, No. 11, Japan, RIC Telecom, Nov. 1, 2002, pp. 22-24.
Office Action dated Jan. 7, 2009, U.S. Appl. No. 11/141,934.
Office Action dated Sep. 12, 2008, U.S. Appl. No. 11/141,934.
Office Action dated Jan. 31, 2008, U.S. Appl. No. 11/141,807.
Office Action dated Jun. 12, 2008, U.S. Appl. No. 11/141,934.
Office Action dated May 2, 2007, U.S. Appl. No. 11/141,807.
Office Action dated Nov. 30, 2007, U.S. Appl. No. 11/141,934.
Office Action dated Oct. 22, 2007, U.S. Appl. No. 11/141,807.
Request for Reconsideration dated Aug. 12, 2008, U.S. Appl. No. 11/141,934.
Request for Reconsideration dated Mar. 4, 2008, U.S. Appl. No. 11/141,934.
Statement in accordance with the Notice from the European Patent Office dated Oct. 1, 2007 concerning business methods, Official Journal of the European Patent Office, Nov. 1, 2007, pp. 592-593, European Patent Office, Munich, Germany, XP007905525.
SYNCML Consortium: "SYNCML SYNC Protocol, Version 1.0" (Dec. 7, 2000), Chapters 1,2,5-8.
Taiwan Search Report—TW093106479—TIPO—Jun. 13, 2011.
Anonymous: "BREW TM Application Note: Developing BREW Applications for Devices with RUIM Units", May 14, 2005, pp. 1-11, XP007920607, Retrieved from the Internet: URL:http://web.archive.org/web/20050514075656/http://brew.qualcomm.com/brew_bnry/pdf/developer/resources/ds/Dev_BREW_Apps.pdf.
Anonymous: "Internet Archive Wayback Machine", Internet Citation, May 14, 2005, p. 1, XP007920684, Retrieved from the Internet: URL:http://wayback.archive.org/web/200506150000007*/http://brew.qualcomm.com/brew_bnry/pdf/developer/resources/ds/Dev_BREW_Apps.pdf [retrieved on Jun. 4, 2012].
Classified Ad 3—No Title, New York Daily Times (1851-1857); Nov. 15, 1853; ProQuest Historical Newspapers: The New York Times (1851-2008) p. 4.
Classified Ad 74—No Title. Chicago Daily Tribune (1923-1963); Oct. 11, 1959; ProQuest Historical Newspapers: Chicago Tribune (1849-1989) p. G34.
"Ellipsus' Mobile Application Provisioning System", Internet Citation, Dec. 2, 2001, XP002266188, Retrieved from the Internet: URL: web.archive.orgfwww.ellipsus.com [retrieved on Jan. 7, 2004].
European Search Report—EP11166428—Search Authority—The Hague—Mar. 8, 2013.
"How can wireless models help my business?", Computer Weekly, Dec. 2, 2003; p. 1-5, Available from: Business Source Complete, Ipswich, MA. Accessed Jul. 1, 2013.
Mcauliffe W., "Broadband heading for move to metered billing", New Media Age, Apr. 29, 2004; p. 1, Available from: Business Source Complete, Ipswich, MA. Accessed Jul. 1, 2013.
Oommen P., "Over the Air Handset Management," Emerging Technologies Symposium, Broadband, Wireless Internet Access, 2000, IEEE Apr. 10-11, 2000, Piscataway, NJ, USA, IEEE, Apr. 10, 2000, pp. 1-4, XP010538894, ISBN: 0-7803-6364-7.
Telesens: TelesensKSCL and Comptel sign strategic agreement; New alliance expands best of suite billing offering and furthers drive towards comprehensive next generation solution for network service providers M2 Presswire, Coventry, Nov. 28, 2000, p. 1.
Floyd R, et al., "Mobile Web Access Using Enetwork Web Express", IEEE Personal Communications, IEEE Communications Society, US, vol. 5, No. 5, Oct. 1, 1998, pp. 47-52, XP000786616.
Seifert A., et al. "A Multi-Version Cache Replacement and Prefetching Policy for Hybrid Data Delivery Environments," Proceeding VLDB '02 Proceedings of the 28th international conference on Very Large, Jan. 1, 2002, pp. 850-861, XP055148735.

* cited by examiner

AUTOMATIC SUBSCRIPTION SYSTEM FOR APPLICATIONS AND SERVICES PROVIDED TO WIRELESS DEVICES

BACKGROUND OF THE INVENTION

I. Field of the Invention

The present invention generally relates to wireless telecommunications and computer networks. More specifically, the present invention relates to a system and method for providing an infrastructure to support an automatic subscription of wireless devices and an end-to-end billing arrangement for services provided to wireless device service subscribers by network carriers and third parties.

II. Description of the Related Art

Wireless devices, such as cellular telephones, communicate packets including voice and data over a wireless network. In existing wireless telecommunication systems, such as cellular telecommunication systems, a wireless service provider or carrier has wireless service subscribers that pay the provider for the time that the wireless device of the subscriber accesses the cellular network. Fees are typically charged to the subscriber for the initial activation of a telecommunication device and then fees can be charged for ongoing airtime and device usage. However, existing systems typically do not account for other activities at the telecommunication device beyond airtime usage.

Further, if the subscriber of the wireless device desires to download and use a software application or upgrade the functionality of the telecommunication device, the user will typically either call a service provider or contact the service provider through another electronic means, such as through a separate Internet access. In some instances, the service provider can transmit the application to the wireless device across the wireless network (through a one time direct access download) or allow the user access a network site with the wireless device through the wireless network and at such site the application is downloadable or accessible to the subscriber. Otherwise service personnel of the provider must have physical access to the telecommunication device to install the software or upgrade the components thereof.

Further, the proliferation of computer technology has made it easier and cheaper to develop software application. A computer programmer can easily develop a video game or a utility application on a personal computer, and the programmer can tailor the game to run on different computer hardware platforms including on a wireless handset. However, the individual application developer encounters difficulty in getting the product to market, especially for applications that are executable on wireless devices. The developer must first create a full version of the application and then sell it to the carriers in order to derive any income. Consequently, creating application for the wireless device market is a huge investment by the developer without the guarantee of return.

Wireless telecommunications carriers may rely on independent developers to develop applications for their users, but this arrangement would create new problems for the carriers. Now, the carriers, instead of hiring many developers, needs to track usages of products developed by these independent developers and pay them accordingly, which can be a huge task itself.

Accordingly, it would be advantageous to provide a system and method that handles end-to-end billing for carriers. Such system should allow wireless services provides to deliver value-added products and services to their subscribers beyond simple airtime, and allow the application developer to receive payments for their products. It is thus to such a system and method for automatically managing subscription billing for wireless device subscribers that the present invention is primarily directed.

SUMMARY OF THE INVENTION

The present invention discloses a system, method, and computer program that automatically manages an application or service subscription price plan for applications and services provided to wireless devices from other computer devices on a wireless network during wireless device end-user interaction with the computer devices. Once an application or subscription is activated, the subscription requires periodic payment (such as monthly) by the wireless device carrier service subscriber (who is not necessarily the end-user at the wireless device interacting on the network) for continued access to the application or service. The wireless device end-user interaction with other computer devices, such as application download servers, is monitored, either directly if the interaction is with the same server that records application or service subscription data, or across the wireless network when the end-user obtains an application or service from another computer device. The application or service subscription can either be billed directly to the wireless device subscriber for the subscription(s) or a bill transmitted to the carrier or other entity to bill the subscriber. In one embodiment, the system includes one or more wireless devices selectively in communication with other computer devices across a wireless network, where each wireless device has an end-user thereof and a computer platform that is able to selectively download and execute software applications thereupon and is accessible by the end-user. At least one server is selectively in communication and interacts with the one or more wireless devices across the wireless network, such interaction typically occurring upon request of the end-user of the wireless device through the wireless network to download or interact with the server. The end-user interaction with at least one server across the wireless network causes a subscription of an application or service, which can be recorded and billed for at the same server or through the interaction of several computer devices on the wireless network.

The method for managing subscription price plans for applications and services provided to wireless devices from computer devices on a wireless network particularly includes the steps of causing a subscription of an application and service to occur from end-user interaction between the wireless device and a server, and recording the subscriptions for the wireless devices at the server. The method can also include the steps of billing the wireless device carrier service subscriber and tracking subscription deletion at the wireless device to automatically discontinue the subscription.

The present system and method thus enable wireless telecommunications carriers to offer value-added services from individual developers providing applications and services to wireless service subscribers without needing to build up a requisite infrastructure for providing the application and services. The system can provide further support by generating invoices to the carrier themselves, carrier subscribers, and can disburse payments for the subscriptions to the applications and service providers, however, in one embodiment, the system simply forwards the subscription records to the carrier for billing and collection. The user of the system can thus tailor the degree of control and responsibility of the billing server(s) in supporting third party applications and services to the wireless devices.

Other objects, advantages, and features of the present invention will become apparent after review of the hereinafter set forth Brief Description of the Drawings, Detailed Description of the Invention, and the claims.

DETAILED DESCRIPTION OF THE INVENTION

In this description, the terms "communication device," "wireless device," "hand held telephone," and "handset" are used interchangeably, the terms "server" and "end-to-end billing system" are used interchangeably, and the term "application" as used herein is intended to encompass executable and non-executable software files, raw data, aggregated data, patches, and other code segments. A "wireless device service subscriber" is a carrier service customer that pays a carrier for network airtime, i.e. voice and data calls from the wireless device. And an "application or service subscription" is a value-added service or application purchased by the wireless device end-user from another computer device on the network, such as an application download server, which is typically billed periodically, e.g. monthly. A "value-added" subscriber" is a party who subscribes to a value-added service and does not have to initiate an automatic subscription when accessing the subscribed value-added service. Thus, in some instances, the purchasing end-user may not be the same person as wireless device subscriber, an example being a child end-user using the wireless device of the parent who is actually the wireless device service subscriber. Further, like numerals refer to like elements throughout the several views. With the advent of 3$^{rd}$ generation (3G) wireless communication technology, more bandwidth becomes available for wireless communications, and handsets and wireless telecommunication devices, such as cellular telephones, pagers, personal digital assistants (PDAs) with increasing capabilities have become available. Now, users can check weather, receive e-mails, receive paging messages, traverse the Internet, and play an interactive game with a remote party all through his wireless handset, in addition to using it for maintaining audio communications with another party. At the same time, proliferation of computer technology has made easier and cheaper to develop digital media and deliver it to the wireless devices. The provision of more value added services, such as downloadable applications, can bring revenue to a wireless service provider or carrier, and one manner to achieve the additional revenue is to provide support to independent application developers. The present invention thus provides the billing support for third party independent application providers who provide applications to end-users of a network carrier as is further described herein.

Figure 1:
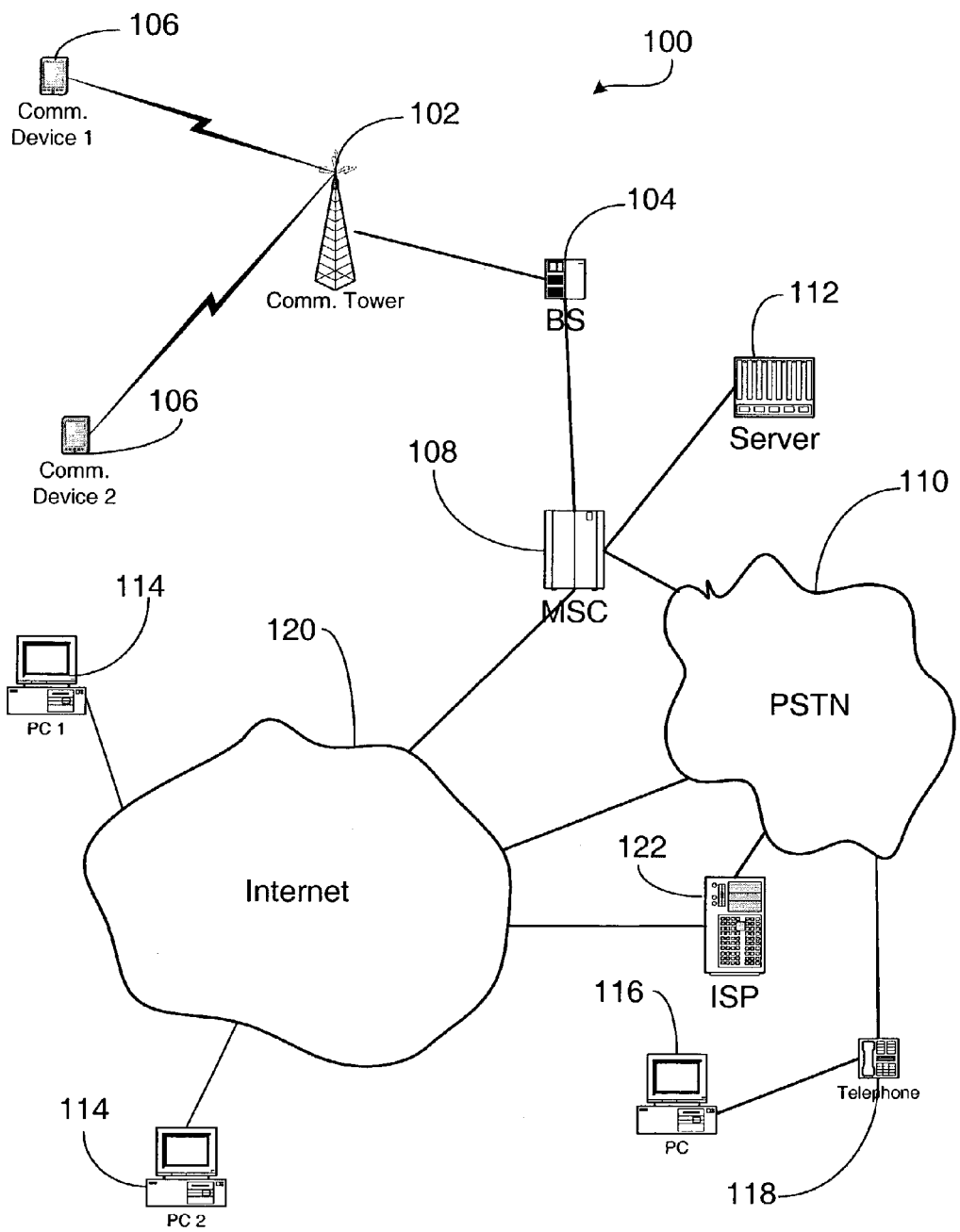
FIG. 1 is a system diagram depicting an embodiment of telecommunication system that supports the automatic subscription system.

FIG. 1 depicts a communication network 100 used according to the present invention. The communication network 100 includes a wireless communications network, a public switched telephone network (PSTN) 110, and the Internet 120. The wireless communication network includes one or more communication towers 102, each connected to a base station (BS) 104 and serving users with communication devices 106. The communication devices 106 can be cellular telephones, pagers, personal digital assistants (PDAs), laptop computers, or other hand-held, stationary, or portable communication device that uses a wireless and cellular telecommunication network. The commands and data input by each user are transmitted as digital data to a communication tower 102. The communication between a user using a communication device 106 and the communication tower 102 can be based on different technologies, such code division multiplexed access (CDMA), time division multiplexed access (TDMA), frequency division multiplexed access (FDMA), global system for mobile communications (GSM), or other protocols that may be used in a wireless communications network or a data communications network. The data from each user is sent from the communication tower 102 to a base station (BS) 104, and forwarded to a mobile switching center (MSC) 108, which may be connected to a public switched telephone network (PSTN) 110.

The PSTN 110 is connected to the Internet 120 and to the wireless communication network through a MSC 108. The PSTN 110 supports users accessing the Internet using a computer 116 through dial up services. The user utilizes the computer 116 and dials through a telephone line 118 to access an Internet service provider (ISP) 122. The ISP 122 provides connection between the user at the computer 116 and the Internet 120. Users at computers 114 may also access directly the ISP 122 through high-speed data connections such as digital subscriber line (DSL), T1 connections, and the like. The Internet 120 is a high-speed data network. A user may access the Internet directly by connecting to a hub on the Internet 120 or access through an ISP 122 connected to the Internet 120. A billing server 112 may be connected to the Internet 120, to the MSC 108, or to the PSTN 110. Preferably, the billing server 112 is connected directly to the MSC 108. However, the server 112 does not necessarily need access to the wireless device 106 but can solely reside on the network and a file level interface from the server can collect and transform the device download event into a billable usage record.

Figure 2:
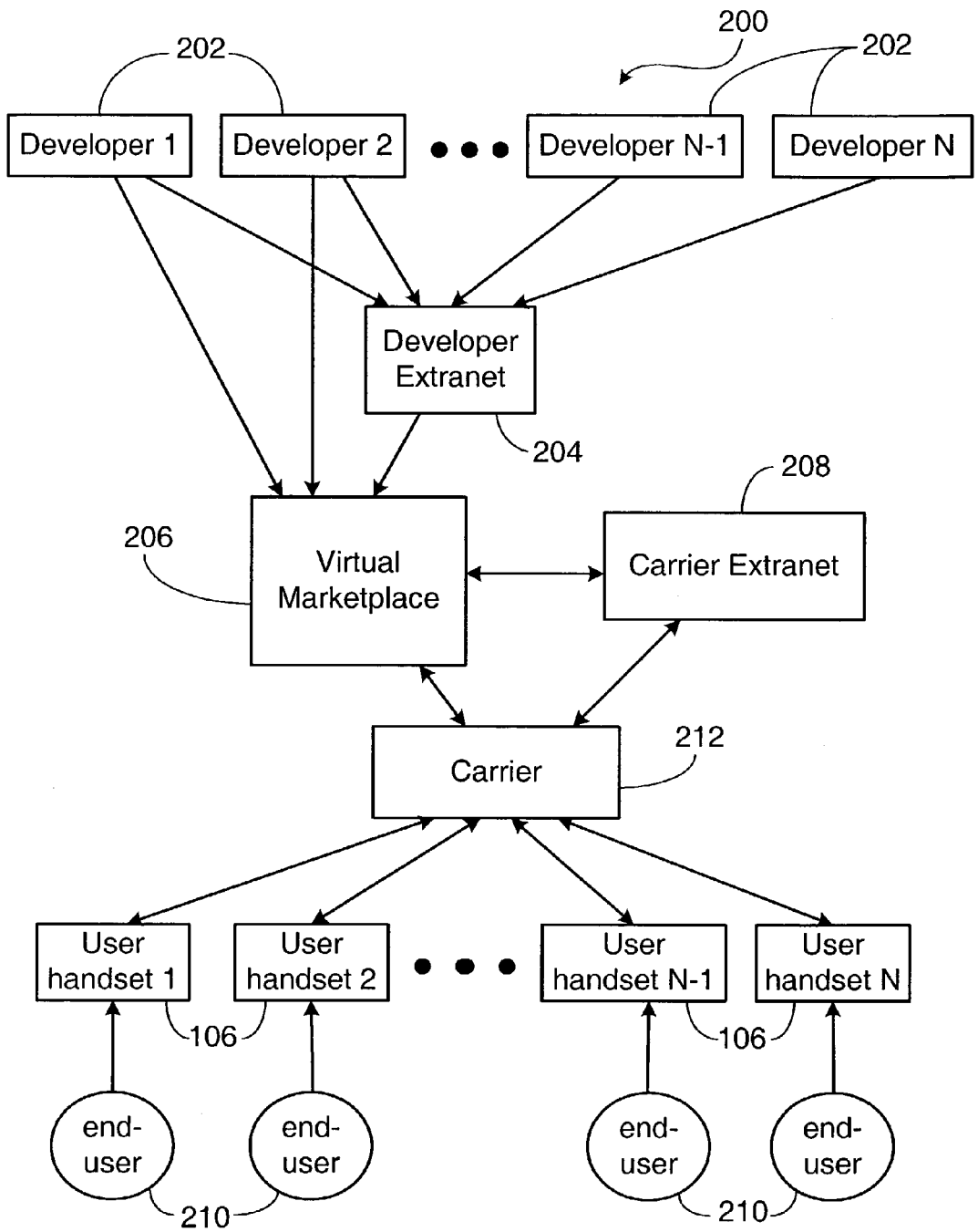
FIG. 2 is a block diagram illustrating one embodiment of the interface architecture between the third party developers, network carriers, and wireless devices.

FIG. 2 is an interface architecture 200 that depicts data flow in a virtual marketplace available for access by the wireless devices 106 that causes an automatic subscription for applications and services accessed by the wireless devices 106. The automatic subscription system of the present application may be a subsystem of the virtual marketplace 206 according to one embodiment, and it may also be an independent system providing the billing services to the virtual marketplace according to another embodiment. The independent developers 202, who generally have access to a computer 114 or 116, can submit their products through an interface 204, also known as the developer extranet, to the virtual marketplace 206, which can reside on a billing server, an application download server, or any computer device on the wireless network. Thus one server can provide the entire virtual marketplace with full billing and collection of proceeds as is further defined herein, or billing can be a separate system from the virtual marketplace with an interface to the marketplace to create the rated billing records and to process subscription billing services. The developers 202 may also submit their products through the developer extranet 204, which then forwards to the virtual marketplace 206, or the developers can submit the product directly to the virtual marketplace 206 If the developer is the carrier then the application is submitted through the carrier extranet 208. The interface 204 may be a web site in communication with the server or a file transfer protocol (FTP) conforming port on the server 112, or other data interconnection. The carrier extranet 208 may be an interface to the carrier's private network. It should be noted that the developer extranet 204 and carrier extranet 208 typically interface to a common server 112 or database that enables the virtual marketplace 206. If the developer extranet and carrier extranet cannot be hosted on private networks to enable interaction between the two without some common connectivity, the negotiation can occur through both extranets interfacing over the Internet to the server 112 or common database.

In one embodiment, before a developer 202 is allowed to submit his product, such as a software application, to the virtual marketplace 206, the developer 202 must certify that the product conforms to the standards established by the virtual marketplace 206. The virtual marketplace 206 publishes a set of standards for its environment that should be followed by developers who wish to submit their products to the virtual marketplace 206. Standardizing the products ensures the product can run without problems on a user handset that supports the virtual marketplace's environment. One example of such environment is Binary Runtime Environment for Wireless (BREW™) and BREW Distributed System (BDS) developed by Qualcomm Corporation. The product may also be required to be tested for conformance by a third party testing organization.

After the developer 202 submits the product, the developer extranet enables negotiation of the price for the product between the developer 202 and carrier. The negotiation may be conducted directly between the carrier(s), other third parties, and the developers 202 within the virtual marketplace 206 using the developer extranet (204), or through the carrier (212) using the carrier extranet 208. Thus, developers 202 can negotiate with other developers, and carriers, to deliver applications and services to carrier customers. After the negotiation, the virtual marketplace 206 retains an agreed to application price plan between developer 202 and carrier 212. The product can be associated with the originating developer before negotiation starts.

After the product is included in the product catalog and made available to the users 210 of communication devices 106. An end-user 210 of the wireless device accesses the wireless telecommunications services through the carrier 212 receives the product catalog from the carrier 212. The end-user 210 can view the product catalog and select a product from the product catalog. The step of "selection" can be an application download, menu display, data transfer, diagnosis tool, or any other computer interaction between the wireless device 106 and billing server 112 or other communication device.

The selection is sent from the user wireless device 106 to the carrier 212, which forwards to the server 112, which is this capacity acts as an application download server. The server 112 checks the selection and downloads the product to the wireless device. The application is dispatched to the end-user's wireless device 106 via the carrier 212. After receiving the application, the end-user 210 can activate it on that end-user's wireless device 106. For certain products, the server 112 needs not to dispatch the entire product to the user device 106, but only a user interface portion of the product. The user interface interacts with the end-user 210 through the user wireless device 106 and sends information back to the server 112 where the application runs. Note that in another embodiment, the application runs on the device or it accesses services/content from a third party server and does not run on the server 112.

Figure 3:
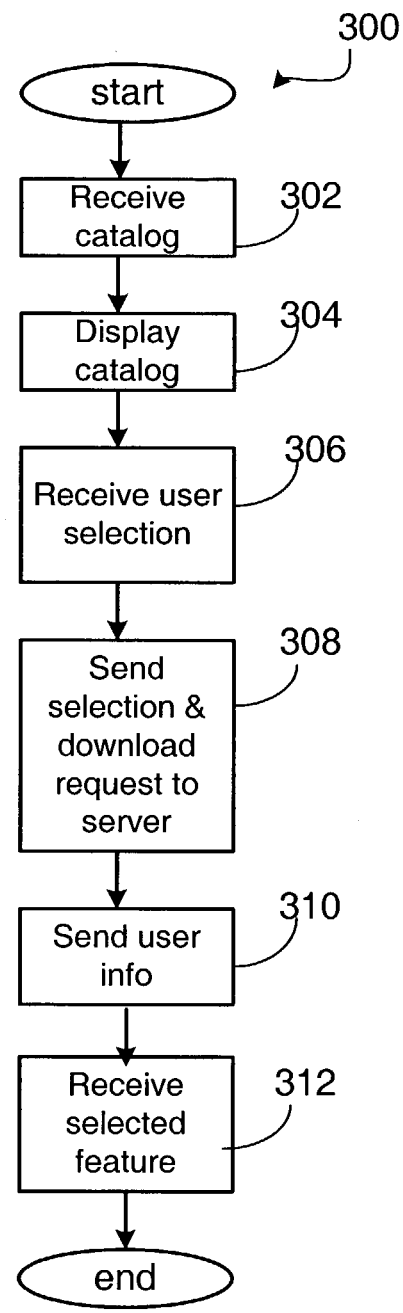
FIG. 3 is a flowchart illustrating an end-user application or service subscription process.

FIG. 3 illustrates an end-user process 300 at the wireless device 106. When the wireless device 106 is powered up and in communication with the carrier, the wireless device 106 receives a catalog of products and services that are available to the user, as shown at step 302, and displays the catalog on the wireless device display screen, as shown at step 304. The products and services available to the user may include interactive games, personal appointment applications, and other utility programs. The user can select a product with an associated price from the catalog, and the selection is received by the wireless device 106, as shown at step 306. The wireless device 106 sends the end-user selection and a download request to the carrier 212, as shown at step 308, through a data channel, and the carrier 212 forwards the selection along with the user and application download information to the server 112. The handset 106 also sends user information, which is normally minimal as carriers 212 are very sensitive to retaining the user specific information to the server 112 through the carrier 212, as shown at step 310. The server 112 retrieves the selected product and dispatches to the user wireless device 106. When the end-user wireless device 106 receives the product, as shown at step 312, the end-user wireless device 106 activates the product for the end-user. It should be noted that in another embodiment, the download acknowledgement can be sent after step 312, as opposed to the time of application or service download.

Figure 4:
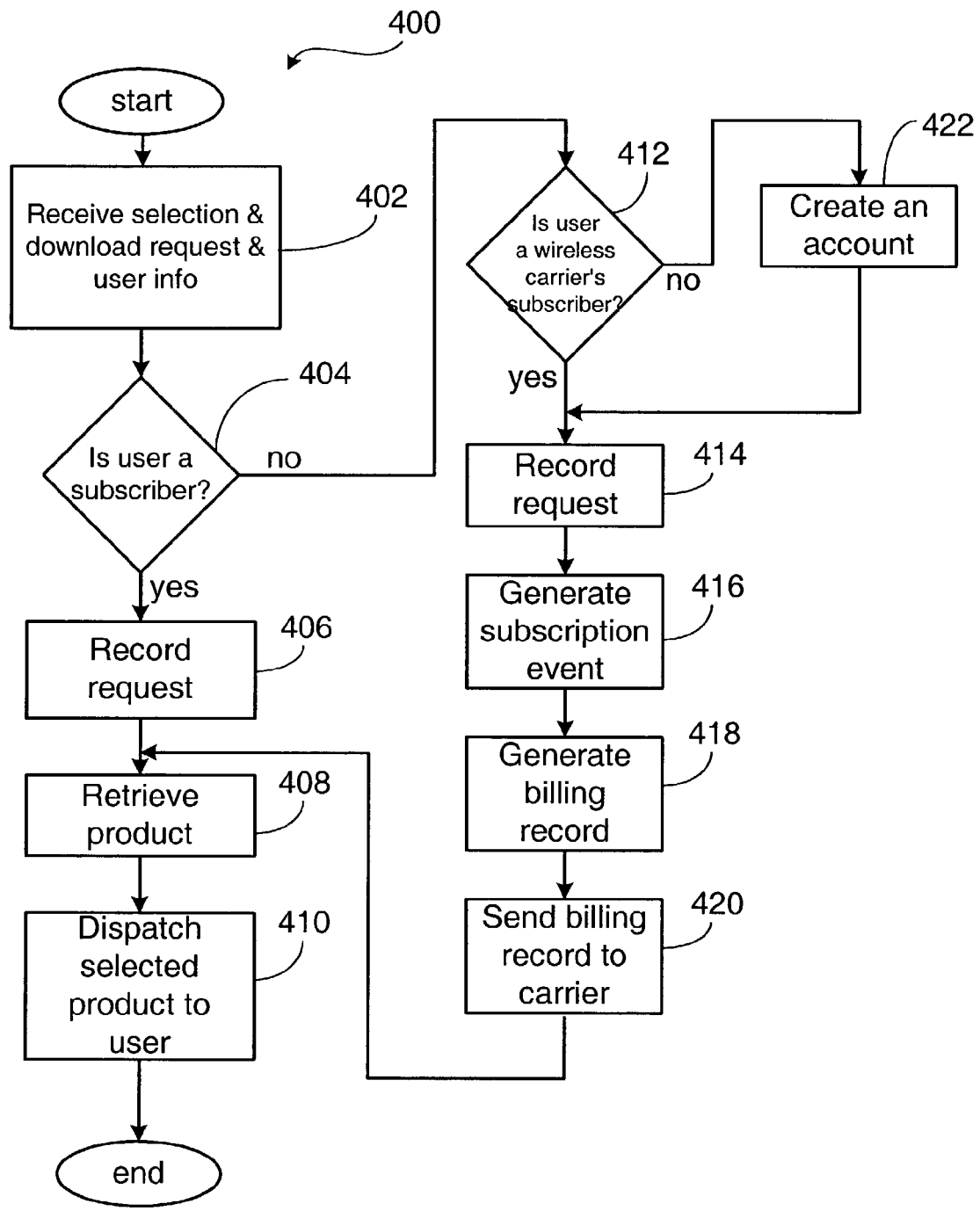
FIG. 4 is a flowchart illustrating a subscription process on a third party application server.

FIG. 4 illustrates one embodiment of the virtual marketplace automatic subscription process 400 executing on a server 112. The server 112 receives the end-user selection along with the download request and the user information from the carrier 212 (or wireless device), as shown at step 402, along with the user information, and can check to see if the user is a value-added service subscriber, as shown at step 404, i.e. is a subscriber for the application download or interactive service. Although, it is not necessary to perform this check if the application or service subscription can be instigated anew by the wireless device end-user. The subscription can also be part of the download acknowledgement. For example, the download may be one time purchase of 30 days of use of an application, or a monthly subscription, and the end-user can have the option of pay per use or monthly subscription. If a check is made the user is a monthly wireless service subscriber, then the server 112 records the request, as shown at step 406, and retrieves the product, as shown at step 408. After retrieving the product, the server 112 sends the product via the carrier data network to the wireless device 106, as shown at step 410.

If so embodied, if the user is not a monthly subscriber, then the server 112 can check the user information received to see whether the user is a authorized subscriber of a wireless carrier, which would occur at decision 412. Conversely, the server 112 could be contacted by a prepaid wireless device or other device not subscribed to a specific carrier's service, and in which case another method of payment can be arranged with the end-user. Alternately, at this point a user authorization check can be made from the server 112 to a carrier 212 authorization service to validate that the user is a an authorized carrier user for the service. The user may be a wireless service subscriber and not yet a value-added service subscriber, and this would be a pay per use situation. If the wireless device 106 is a wireless service subscriber, then the server 112 has that wireless subscriber's information and an account set up for him. The server 112 records the request, as shown in step 414, and generates a one-time billable event, as shown in step 416. The server 112 can also generate a monthly billing record, step 418, and sends the billing record to the carrier 212, step 420. It should be noted that steps 414, 416, 418, 420 may not occur until after 410 as a billable event is not logged or account created at 422 a successful download is confirmed was successful. Alternately, the server 112 can send data to cause another device on the network to create a billing record for downloaded applications. For pay per use value-added subscribers, a billing record is generated for each application download or other subscription event. After the billing process is taken care of (pre-pay only), the server 112 proceeds to retrieve the product, step 408, and sends it to the user, step 410. For post pay events, the download proceeds and the download event is recorded and billing is handled after the end-user has the application on the device.

In another embodiment, the system also handles the situation when the user is using a pre-paid wireless telephone, i.e., the user is not a monthly wireless service subscriber. The wireless telephone device can be a pre-paid device, where the user can purchase in advance for wireless communications services. Further, an application download server can make a call to a carrier provided pre-pay service first to authorize the application download and secondly to debit the customer account. Pre-pay consumers are then not able to download subscription based applications. The amount of services purchased may be stored in the wireless device itself or in a card that can be inserted into the wireless device. This amount is debited each time the user makes a wireless call. When the amount is depleted, the wireless device can no longer place a wireless call, unless the user replenishes it at a dealer or purchases a new pre-paid card.

When a wireless device subscriber that has no existing subscription account selects a product for download, the server 112 can automatically create an account for this user, as shown in step 422, and then proceed similarly as if the user were a monthly subscriber. Such step is unnecessary if only usage records exist on the server 112. If so embodied, a billing record is generated, as shown at step 418, and sent to the carrier, as shown at step 420, before the product is retrieved, as shown at step 408, and sent to the user, as shown at step 410. The carrier 212 may deduct the amount from the billing record for the product from the user's pre-paid amount.

When recording the request as shown in step 406 or step 414, the server 112 can extract demographic information from the user information and record it along with the product information. One method of obtaining demographic information is using the Subscriber ID (SID) to derive detailed information about their customers and buying trends. The demographic information may be made available to the product's developer, so the developer may have an idea about the user of his product. The demographic information may also be provided to the carriers and allowing the carriers to have a better picture about the users who tend to subscribe to similar products or services.

Figure 5:
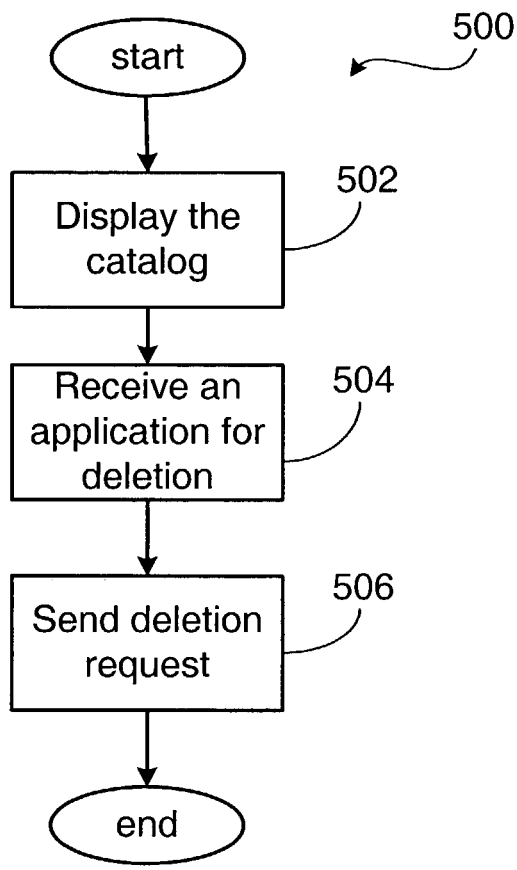
FIG. 5 is a flowchart illustrating an end-user subscription termination process.

FIG. 5 illustrates an end-user process for terminating an active subscription of a product by using the deletion process 500. The end-user can select a product from the displayed active applications displayed on the wireless device 106, as shown in step 502. The wireless device 106 can display more than one catalog: one for all the products and one for the products targeted to the individual or groups that the user is associated with. The wireless device 106 receives the selection, as shown at step 504, and sends the deletion request along with the product and user information to the server 112, as shown at step 506. Alternately, if the application is solely resident on the wireless device 106, the user does not have to browse the catalog to delete the application and unsubscribe. The user can utilize an application manager to delete the application on the device and the delete event is queued and sent to the server 112 on the next data call.

Figures 6, 7:
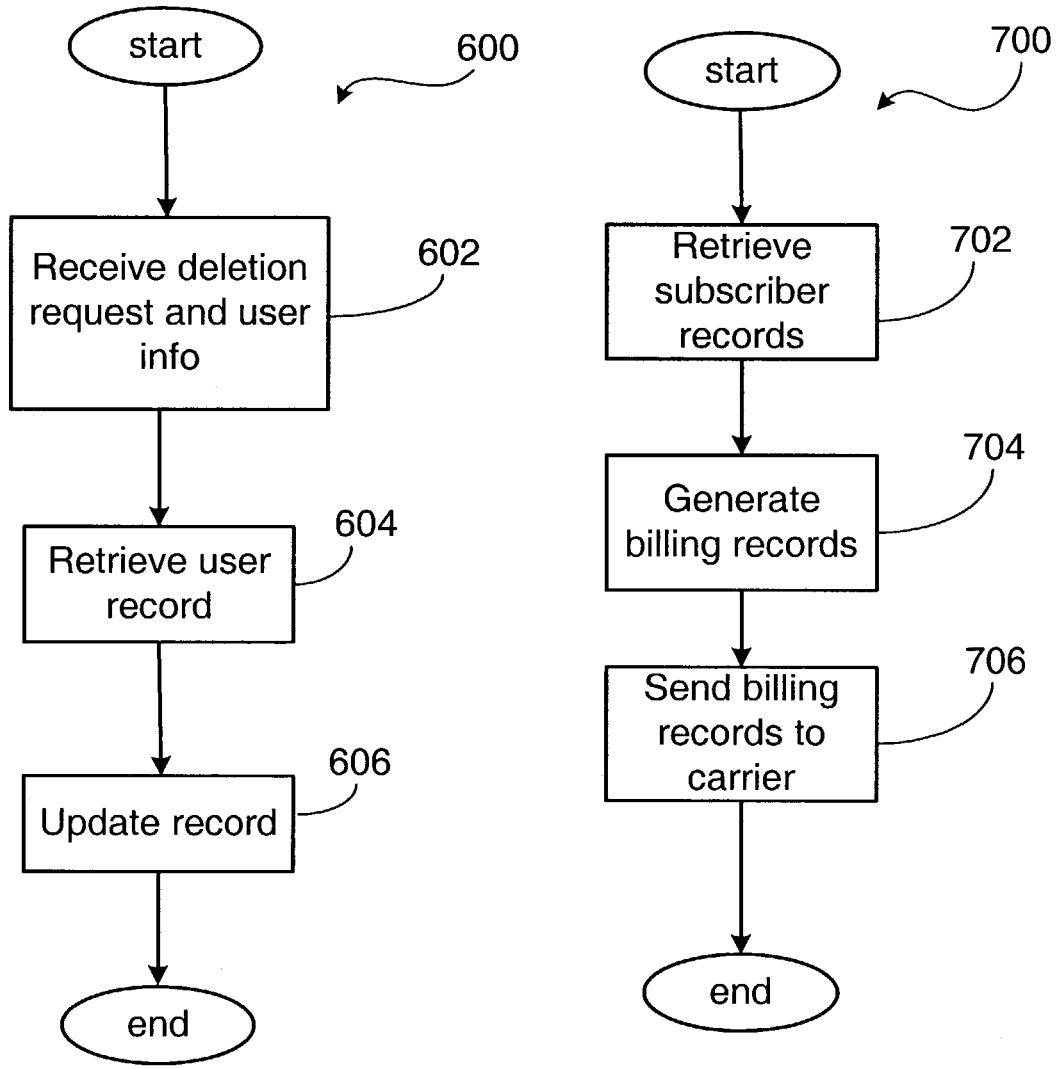
FIG. 6 is a flowchart illustrating a deletion process on a third party computer device.
FIG. 7 is a flowchart illustrating a monthly invoicing process of the wireless subscriber of the carrier network.

FIG. 6 illustrates a server process 600 for a user terminating a subscription on a product for a specific value-added subscriber. When the server 112, either an application download server or transaction server, receives the deletion request and related information, step 602, the server 112 retrieves the user record, such as SID information, as shown at step 604, and updates the user record by removing the product from the list of active subscription products, as shown at step 606. The request can be simple deletion of a resident application for which the end-user has a subscription, and a flag or other notification means can be sent to the server 112 for notification of the deletion.

The system accordingly can support flexible subscription plans. A user may subscribe to a flat price service plan, where the user pays a fixed price per month and the wireless device subscriber can access all products listed in the catalog. The end-user may also subscribe to an adjustable price service plan, where the monthly subscription fee depends on how many products or what products the user has subscribed to. The user may also purchase an application based on a one-time flat fee for a specified number of uses service plan. The system will automatically account for the subscription in whatever method provided.

FIG. 7 illustrates the monthly invoice process 700, which can be a process on a carrier 212 server. If so embodied, the server 112 can periodically generate invoices or other billing information for its monthly application and service subscribers every month and sends the invoices or other billing information to the carriers 212 of the wireless device service subscribers. The server 112 retrieves subscriber records, as shown at step 702, and then generates billing records for those wireless service subscribers as shown at step 704. Customer may utilize products which are subscription services or one-time purchase. Since the server 112 may support multiple carriers and users who are subscribers with different carriers, the billing records are segregated and sent to the carrier based on carrier specific tagged identifier, as shown at step 706.

Figure 8:
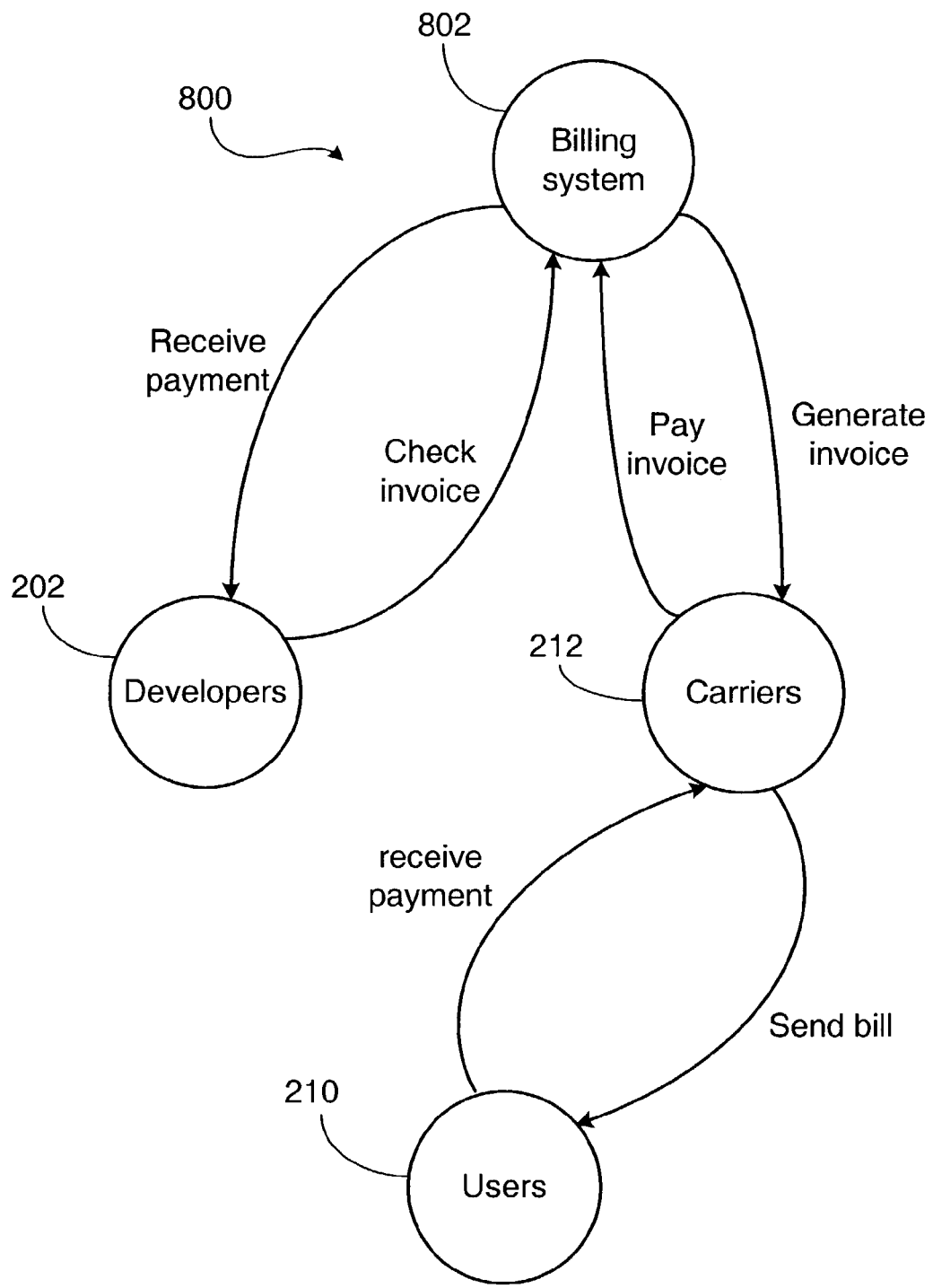
FIG. 8 is a diagram illustrating a multi-party settlement map for third party applications and services provided to the end-users of a wireless network carrier.

FIG. 8 is a relationship map 800 illustrating the financial relationship between developers 202, the subscription billing system 802, carriers 212, and end-users at the wireless device 210. The subscription billing system 802 may support more than one carrier 212 and generate invoices separately for each carrier 212. The invoices generated are available for viewing by the developers 202. Each carrier 212 sends a bill to each individual user 210 who has subscribed or used a product or service from a product catalog, and receives a payment from each user 210. The carrier 212 pays the invoice to billing system 802, and the billing system 802 makes payments to the developers 202.

The relationship 800 shows the advantage of the present invention. For developers 202, the present invention allows for easy marketing of their products and eliminates the hassle of dealing with individual buyers or the trouble of searching for publishers to carry their products. For carriers 212, the present invention provides a way to make more products available to end users 210, thus providing new venues to generate more profits, without the need to hire a large number of software developers. For users 210, the present invention makes more applications available to the users 210 and maybe be eliminates the need for the users 210 to carry multiple electronic devices, such as pagers, personal digital assistants (PDAs), or even game devices.

Figure 9:
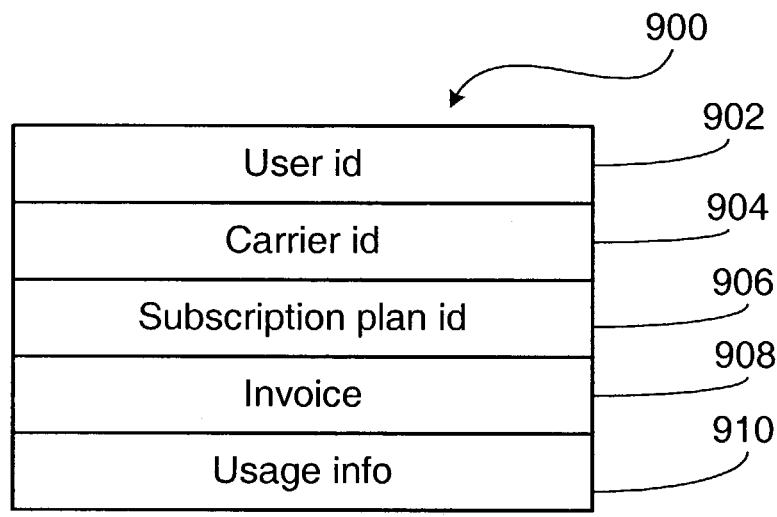
FIG. 9 is an illustration of an invoice record according to one embodiment of the system.

FIG. 9 illustrates an exemplary embodiment of a billing record 900. The billing record 900 is kept in a billing database in the server 112 and has user identification 902, carrier identification 904, subscription plan identification 906 an invoice 908 (which can include rated price information, developer fee, and list price information) and usage information 910. The billing record is generated by the billing server 112 and sent to each carrier 212. The carrier 212 then bills the user for the rated price. The carrier 212 may adjust the invoice amount before billing the wireless device subscriber.

Figure 10:
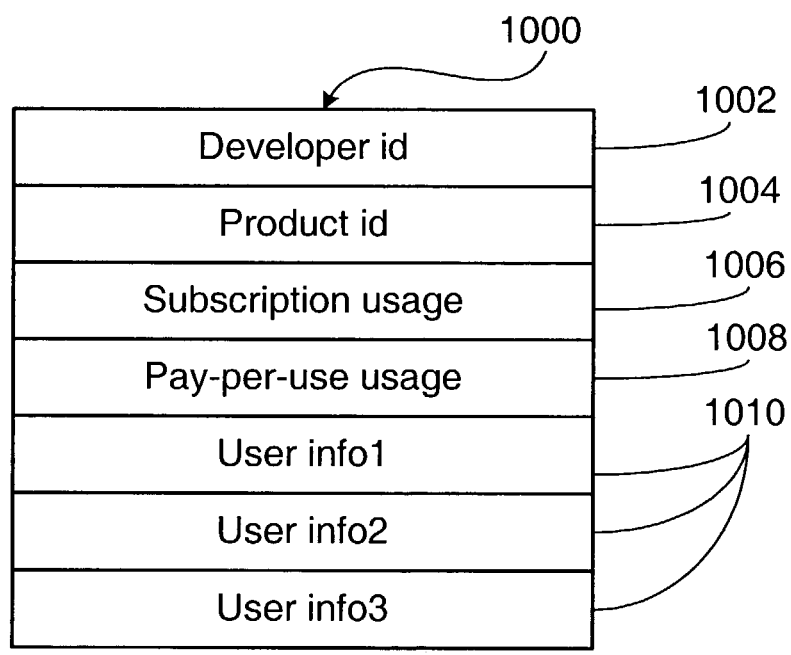
FIG. 10 is an illustration of a product (application or service) record according to one embodiment of the system.

FIG. 10 illustrates a product record 1000 according to one embodiment of the invention. The product record 1000 is accessible to developers for viewing. It should be noted that sometimes only a subset of the billing record is accessible to the developer because there is carrier sensitive information in the billing record that is not available to the developer. The product record 1000 is kept in a product database in the billing server 112 and has a developer identification field 1002, a product identification field 1004, a subscription usage (such as list price) information field 1006, a pay-per-use usage information field 1008, and one or more user information fields 1010. The subscription usage field 1006 can list how many value-added subscribers have subscribed this product on monthly basis; the pay-per-use usage field 1008 can list how many specific value-added subscriber have subscribed this product on pay-per-use basis; the user information field 1010 may list demographical data extracted from the user information received. The usage record can also contain information such as subscriber id, timestamp, part number, part name, event type (i.e., download or delete), application list price, application developer fee, application license information, etc.

Figure 11:
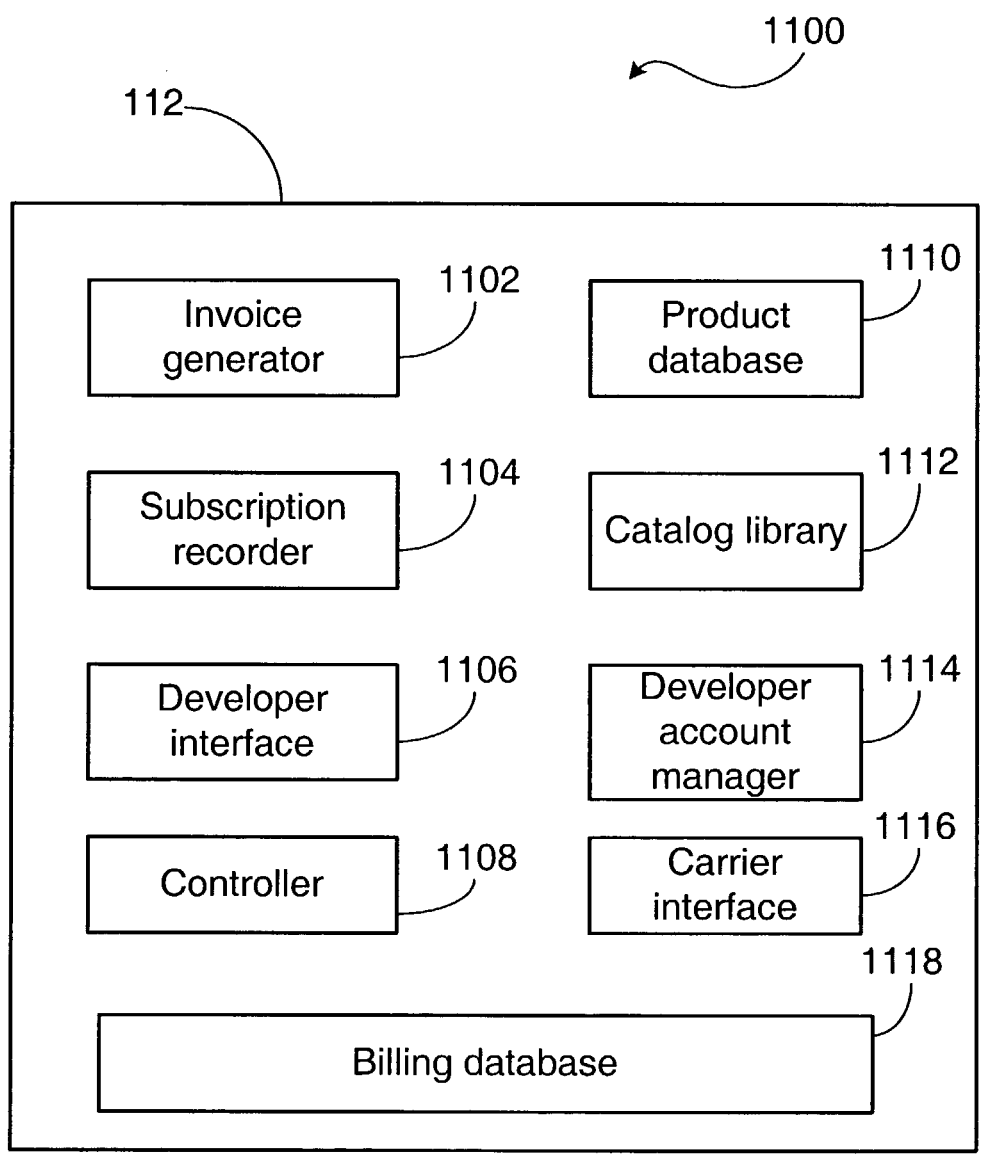
FIG. 11 is an exemplary embodiment of a billing server.

FIG. 11 illustrates one embodiment of the components of a billing server, such as can be implemented on server 112. The server 112 has an invoice generator 1102, a subscription recorder 1104, a developer interface 1106, a controller 1108, a product database 1110, a catalog library 1112, a developer account manager 1114, a carrier interface 1116, and a billing database 1118. The invoice generator 1102 generates invoices to the carriers; the subscription recorder 1104 records user selections; the developer interface 1106 receives product submissions from developers and provides access to the developer for viewing subscription information; the product database 1110 stores all the products submitted; the catalog library 1112 stores all the catalogs devised for different carriers and hardware platforms; the developer account manager 1114 provides subscription information or other data to the developers and makes payments to the developers; the carrier interface 1116 interfaces with the carriers; the billing database 1118 records billing records for all the users; and the controller 1108 oversees the operation of the server 112. In other embodiment, the application download server or transaction manager generates carrier invoices, and the carrier billing systems generate customer invoices. Consequently, the transaction manager manages active subscriptions and generates monthly subscription billing events that get exported to carrier billing systems and the transaction manager can supports billing services to developers 202 for developer payment reconciliation but this summary usage information does not include carrier sensitive usage information such as SID, etc.

A developer can access the server 112 through the interface 204, which is handled by the developer interface 1106, by entering his developer identification number. The server 112 assigns to each developer an identification number and a password. After entering the identification number and the password, the billing server 112 allows the developer to access at least billing support services associated with the developer identification number.

It can thus be seen that the system yields a method for providing an end-to-end billing system 802 that supports multiple parties, where the subscription billing system 802 supports plurality of developers and a multitude of end-users through various carriers. The system is transparent to the end-user that only sees the subscription-causing event and the subscription-ending event, with the system handling the billing between those events. The billing system 802 sets up individual accounts for each developer, where the products developed by each developer is listed in his own account. The subscription billing system 802 also can associate each end-user with a carrier and records each end user's service plan. The system can also record product requests, deliver the product requested to the end-user, and generate invoices individually on per use basis or monthly on subscription basis. If so embodied, the payment collected from each carrier is recorded and an appropriate portion of the collected payment is distributed to the developers whose products have been used or subscribed by the end users.

In view of the method being executable on the computer platform of a computing device such as server 112, the present invention includes a program resident in a computer readable medium, where the program directs a server or other computing device having a computer platform to perform the steps of the method. The computer readable medium can be the memory of the server 112, or can be in a connective database. Further, the computer readable medium can be in a secondary storage media that is loadable onto a wireless device computer platform, such as a magnetic disk or tape, optical disk, hard disk, flash memory, or other storage media as is known in the art.

In the context of FIGS. 3-7, the method may be implemented, for example, by operating portion(s) of the wireless network to execute a sequence of machine-readable instructions, such the server 112. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail maybe made without departing from the spirit and scope of the present invention as set forthe in the following claims. Furthermore, although elements of the invention may be described or claimed in the singular, the plural is contemplated unless limitation to the singular is explicitly stated.

What is claimed is:

1. A method for creating a given subscription for applications or services provided to wireless devices from computer devices on a wireless network, comprising:

transmitting, by a service computer device, a catalog to a wireless device, wherein the catalog identifies at least one of a product or a service available from the service computer device, wherein each of the at least one of the product or service corresponds to an agreed-to price plan determined between a respective provider of the at least one of the product or service and a respective cellular wireless network carrier;

receiving a request for a selected product or service from the wireless device, wherein the request comprises user information corresponding to the wireless device and identification of the selected product or service from the catalog;

determining if the user information corresponds to an existing subscription account allowing access to the selected product or service;

determining if the wireless device corresponds to an authorized subscriber account of the respective cellular wireless network carrier, if the user information does not correspond to the existing subscription account;

establishing a new subscription account corresponding to the wireless device for a subscription to the selected product or service based on the user information if the user information does not correspond to the existing subscription account irrespective of whether the wireless device is determined to correspond to the authorized subscriber account of the respective cellular wireless network carrier when the request for the selected product or service is received from the wireless device, wherein the subscription requires a payment based on the respective agreed-to price plan corresponding to the selected product or service;

transmitting a subscription event to the respective cellular wireless network carrier based on the subscription if the wireless device is determined to correspond to the authorized subscriber account of the respective cellular wireless network carrier, wherein the subscription event comprises at least a portion of the user information and further indicates the subscription established for the wireless device; and transmitting the selected product or service to the wireless device.

2. A non-transitory computer-readable medium containing instructions stored thereon that when executed by a service computer device on a wireless network directs the service computer device to perform the actions of:

transmitting a catalog to a wireless device, wherein the catalog identifies at least one of a product or a service available from the service computer device, wherein each of the at least one of the product or service corresponds to an agreed-to price plan determined between a respective provider of the at least one of the product or service and a respective cellular wireless network carrier;

receiving a request for a selected product or service from the wireless device, wherein the request comprises user information corresponding to the wireless device and identification of the selected product or service from the catalog;

determining if the user information corresponds to an existing subscription account allowing access to the selected product or service;

determining if the wireless device corresponds to an authorized subscriber account of the respective cellular wireless network carrier, if the user information does not correspond to the existing subscription account;

establishing a new subscription account corresponding to the wireless device for a subscription to the selected product or service based on the user information if the user information does not correspond to the existing subscription account irrespective of whether the wireless device is determined to correspond to the authorized subscriber account of the respective cellular wireless network carrier when the request for the selected product or service is received from the wireless device, wherein the subscription requires a payment based on the respective agreed-to price plan corresponding to the selected product or service;

transmitting a subscription event to the respective cellular wireless network carrier based on the subscription if the wireless device is determined to correspond to the authorized subscriber account of the respective cellular wireless network carrier, wherein the subscription event comprises at least a portion of the user information and further indicates the subscription established for the wireless device; and transmitting the selected product or service to the wireless device.

3. A service computer device for creating a given subscription for applications or services provided to wireless devices from computer devices on a wireless network, comprising:

means for transmitting a catalog to a wireless device, wherein the catalog identifies at least one of a product or a service available from the service computer device, wherein each of the at least one of the product or service corresponds to an agreed-to price plan determined between a respective provider of the at least one of the product or service and a respective cellular wireless network carrier;

means for receiving a request for a selected product or service from the wireless device, wherein the request comprises user information corresponding to the wireless device and identification of the selected product or service from the catalog;

means for determining if the user information corresponds to an existing subscription account allowing access to the selected product or service;

means for determining if the wireless device corresponds to an authorized subscriber account of the respective cellular wireless network carrier, if the user information does not correspond to the existing subscription account;

means for establishing a new subscription account corresponding to the wireless device for a subscription to the selected product or service based on the user information if the user information does not correspond to the existing subscription account irrespective of whether the wireless device is determined to correspond to the authorized subscriber account of the respective cellular wireless network carrier when the request for the selected product or service is received from the wireless device, wherein the subscription requires a payment based on the respective agreed-to price plan corresponding to the selected product or service;

wherein the means for transmitting is further configured for transmitting a subscription event to the respective cellular wireless network carrier based on the subscription if the wireless device is determined to correspond to the authorized subscriber account of the respective cellular wireless network carrier, wherein the subscription event comprises at least a portion of the user information and further indicates the subscription established for the wireless device; and wherein the means for transmitting is further configured for transmitting the selected product or service to the wireless device.

4. A service computer device for creating a given subscription for applications or services provided to wireless devices on a wireless network, comprising:

a catalog library comprising a catalog available for transmission to a wireless device, wherein the catalog identifies at least one of a product or a service available from the service computer device, wherein each of the at least one of the product or service corresponds to an agreed-to price plan determined between a respective provider of the at least one of the product or service and a respective cellular wireless network carrier;

a controller operable to receive a request for a selected product or service from the wireless device, wherein the request comprises user information corresponding to the wireless device and identification of the selected product or service from the catalog;

wherein the controller is further operable to determine if the user information corresponds to an existing subscription account allowing access to the selected product or service;

wherein the controller is further operable to determine if the wireless device corresponds to an authorized subscriber account of the respective cellular wireless network carrier if the user information does not correspond to the existing subscription account;

wherein the controller is further operable to establish a new subscription account corresponding to the wireless device for a subscription to the selected product or service based on the user information if the user information does not correspond to the existing subscription account irrespective of whether the wireless device is determined to correspond to the authorized subscriber account of the respective cellular wireless network carrier when the request for the selected product or service is received from the wireless device, wherein the subscription requires a payment based on the respective agreed-to price plan corresponding to the selected product or service;

wherein the controller is further operable to transmit a subscription event to the respective cellular wireless network carrier based on the subscription if the wireless device is determined to correspond to the authorized subscriber account of the respective cellular wireless network carrier, wherein the subscription event comprises at least a portion of the user information and further indicates the subscription established for the wireless device; and wherein the controller is further operable to transmit the selected product or service to the wireless device.

5. A wireless device, comprising:
a computer platform operable to:
receive a catalog identifying at least one of a product or a service available from a service computer device, wherein each of the at least one of the product or service corresponds to an agreed-to price plan determined between a respective provider of the at least one of the product or service and a respective cellular wireless network carrier;
transmit a request for a selected product or service, wherein the request comprises user information corresponding to the wireless device and identification of the selected product or service from the catalog; and
receive the selected product or service if the service computer device establishes a new subscription account corresponding to the wireless device for a subscription to the selected product or service based on the user information if the user information does not correspond to an existing subscription account and if, upon determining that the user information does not correspond to the existing subscription account irrespective of whether the wireless device corresponds to an authorized subscriber account of the respective cellular wireless network carrier when the request for the selected product or service is transmitted from the wireless device, wherein the subscription requires a payment based on the respective agreed-to price plan corresponding to the selected product or service.

6. A method of obtaining a given subscription for a wireless device, comprising:
receiving, at the wireless device, a catalog identifying at least one of a product or a service available from a service computer device, wherein each of the at least one of the product or service corresponds to an agreed-to price plan determined between a respective provider of the at least one of the product or service and a respective cellular wireless network carrier;
transmitting a request for a selected product or service, wherein the request comprises user information corresponding to the wireless device and identification of the selected product or service from the catalog; and
receiving the selected product or service if the service computer device establishes a new subscription account corresponding to the wireless device for a subscription to the selected product or service based on the user information if the user information does not correspond to an existing subscription account and if, upon determining that the user information does not correspond to the existing subscription account irrespective of whether the wireless device corresponds to an authorized subscriber account of the respective cellular wireless network carrier when the request for the selected product or service is transmitted from the wireless device, wherein the subscription requires a payment based on the respective agreed-to price plan corresponding to the selected product or service.

7. A wireless device, comprising:
means for receiving a catalog identifying at least one of a product or a service available from a service computer device, wherein each of the at least one of the product or service corresponds to an agreed-to price plan determined between a respective provider of the at least one of the product or service and a respective cellular wireless network carrier;
means for transmitting a request for a selected product or service, wherein the request comprises user information corresponding to the wireless device and identification of the selected product or service from the catalog; and
means for receiving the selected product or service if the service computer device establishes a new subscription account corresponding to the wireless device for a subscription to the selected product or service based on the user information if the user information does not correspond to an existing subscription account and if, upon determining that the user information does not correspond to the existing subscription account irrespective of whether the wireless device corresponds to an authorized subscriber account of the respective cellular wireless network carrier when the request for the selected product or service is transmitted from the wireless device, wherein the subscription requires a payment based on the respective agreed-to price plan corresponding to the selected product or service.

8. A non-transitory computer-readable medium containing instructions stored thereon that when executed by a wireless device directs the wireless device to perform the actions of:
   receiving a catalog identifying at least one of a product or a service available from a service computer device, wherein each of the at least one of the product or service corresponds to an agreed-to price plan determined between a respective provider of the at least one of the product or service and a respective cellular wireless network carrier;
   transmitting a request for a selected product or service, wherein the request comprises user information corresponding to the wireless device and identification of the selected product or service from the catalog; and
   receiving the selected product or service if the service computer device establishes a new subscription account corresponding to the wireless device for a subscription to the selected product or service based on the user information if the user information does not correspond to an existing subscription account and if, upon determining that the user information does not correspond to the existing subscription account irrespective of whether the wireless device corresponds to an authorized subscriber account of the respective cellular wireless network carrier when the request for the selected product or service is transmitted from the wireless device, wherein the subscription requires a payment based on the respective agreed-to price plan corresponding to the selected product or service.

9. A method of operating a service computer device that is configured to provide products and/or services to computer devices over a communications network, comprising:
   transmitting a catalog to a given computer device over the communications network, wherein the catalog identifies at least one of a product or a service available from the service computer device, wherein each of the at least one of the product or service corresponds to an agreed-to price plan determined between a respective provider of the at least one of the product or service and a respective service provider;
   receiving a request for a selected product or service from the given computer device, wherein the request comprises user information corresponding to the given computer device and identification of the selected product or service from the catalog;
   determining whether the user information indicates that the given computer device or a user of the given computer device has a current subscription for access to the selected product or service;
   coordinating, with the respective service provider associated with the selected product or service, to arrange for subscription registration and billing of the selected product or service by the respective service provider in response to the request if the given computer device or the user of the given computer device is determined not to have the current subscription; and
   dispatching the selected product or service to the given computer device in response to the request (i) while bypassing the coordinating if the given computer device or the user of the given computer device is determined to have the current subscription, or (ii) in conjunction with the coordinating if the given computer device or the user of the given computer device is determined to not have the current subscription.

10. A method of operating a server device that is configured to provide products and/or services to client devices, comprising:
    transmitting a catalog, wherein the catalog identifies at least one of a product or a service available from the server device, wherein each of the at least one of the product or service corresponds to an agreed-to price plan between a respective provider of the at least one of the product or service and a respective service provider;
    receiving a request for a selected product or service, wherein the request comprises user information corresponding to a given client device and identification of the selected product or service from the catalog;
    determining whether the user information indicates that the given client device or a user of the given client device has a current subscription for access to the selected product or service;
    arranging for subscription registration and billing of the selected product or service by the respective service provider in response to the request if the given client device or the user of the given client device is determined not to have the current subscription; and
    dispatching the selected product or service to the given client device in response to the request (i) while bypassing the coordinating if the given client device or the user of the given client device is determined to have the current subscription, or (ii) in conjunction with the coordinating if the given client device or the user of the given client device is determined to not have the current subscription.

11. The service computer device of claim 4, wherein the subscription occurs upon a download of an application comprising the selected product or service from the service computer device to the wireless device.

12. The service computer device of claim 4, wherein the subscription occurs upon an execution on the service computer device of an application comprising the selected product or service by the wireless device.

13. The service computer device of claim 4, wherein the subscription occurs upon access by the wireless device to an application comprising the selected product or service resident on another computer device on the wireless network.

14. The service computer device of claim 4, wherein the service computer device further tracks subscription-ending events of the wireless device.

15. The service computer device of claim 14, wherein at least one of the subscription-ending event comprises a notification from the wireless device indicating that an end-user thereof has requested to end the subscription.

16. The service computer device of claim 14, wherein at least one of the subscription-ending event comprises a notice of the wireless device deleting a subscribed application.

17. The method of claim 1, further comprising generating a bill at the service computer device for the wireless device based upon the subscription.

18. The method of claim 17, further comprising transmitting the bill from the service computer device to a computer device on the wireless network.

19. The method of claim 1, wherein the subscription is caused to occur through a download of an application comprising the selected product or service from the service computer device to the wireless device.

20. The method of claim 1, wherein the subscription is caused to occur through an execution on the service computer device of an application comprising the selected product or service by the wireless device.

21. The method of claim 1, further comprising tracking subscription-ending events of the wireless device.

22. The method of claim 1, wherein the tracking of the subscription-ending events further comprises tracking wireless device indications that an end-user has requested to end the subscription.

23. The method of claim 22, wherein the tracking of the subscription-ending events further comprises tracking the wireless device deleting a subscribed application.

24. The method of claim 23, further comprising receiving a notification of the deletion of the subscribed application from the wireless device.

25. The non-transitory computer-readable medium of claim 2, wherein the instructions direct the service computer device to perform the action of generating a bill for the wireless device based upon the subscription.

26. The non-transitory computer-readable medium of claim 25, wherein the instructions direct the service computer device transmit the bill to another computer device on the wireless network.

27. The non-transitory computer-readable medium of claim 2, wherein the subscription is caused to occur through a download of an application comprising the selected product or service from the service computer device to the wireless device.

28. The non-transitory computer-readable medium of claim 2, wherein the instructions direct the service computer device to perform the action of tracking subscription-ending events of the wireless device.

29. The non-transitory computer-readable medium of claim 28, wherein the instructions direct the action of tracking subscription-ending events to comprise tracking wireless device indications that an end-user has requested to end the subscription.

30. The non-transitory computer-readable medium of claim 29, wherein the instructions direct the action of tracking subscription-ending events to comprise tracking a notification from the wireless device indicating that the wireless device has deleted a subscribed application.

31. The wireless device of claim 5, wherein the respective agreed-to price plan corresponding to the selected product or service is determined at a virtual marketplace accessible to the respective provider and the respective cellular wireless network carrier.

32. The method of claim 6, wherein the respective agreed-to price plan corresponding to the selected product or service is determined at a virtual marketplace accessible to the respective provider and the respective cellular wireless network carrier.

33. The service computer device of claim 3, wherein the respective agreed-to price plan corresponding to the selected product or service is determined at a virtual marketplace accessible to the respective provider and the respective cellular wireless network carrier.

34. The service computer device of claim 4, wherein the respective agreed-to price plan corresponding to the selected product or service is determined at a virtual marketplace accessible to the respective provider and the respective cellular wireless network carrier.

35. The method of claim 1, wherein the respective agreed-to price plan corresponding to the selected product or service is determined at a virtual marketplace accessible to the respective provider and the respective cellular wireless network carrier.

36. The non-transitory computer-readable medium of claim 2, wherein the respective agreed-to price plan corresponding to the selected product or service is determined at a virtual marketplace accessible to the respective provider and the respective cellular wireless network carrier.

37. The method of claim 1, wherein the service computer device is independent of the respective cellular wireless network carrier.

38. The method of claim 1, further comprising receiving confirmation of a successful download of the selected product or service from the wireless device, wherein transmitting the subscription event to the respective cellular wireless network carrier is dependent upon the receiving of the confirmation.

39. The method of claim 1, further comprising generating, on a periodic basis, a billing record including the subscription event and subsequent subscription events for the wireless device over a time period, and transmitting the billing record to the respective cellular wireless network carrier on the periodic basis.

40. The method of claim 1, further comprising:
communicating with a carrier-provided pre-pay service to authorize a download of the selected product or service if the user information identifies the wireless device as a pre-paid device; and
establishing the new subscription account corresponding to the wireless device for the subscription to the selected product or service if the user information identifies the wireless device as the pre-paid device and if the communicating results in receiving authorization for the download.

41. The non-transitory computer-readable medium of claim 2, wherein the service computer device is independent of the respective cellular wireless network carrier.

42. The non-transitory computer-readable medium of claim 2, wherein the instructions cause the service computer device to perform the action of receiving confirmation of a successful download of the selected product or service from the wireless device, wherein transmitting the subscription event to the respective cellular wireless network carrier is dependent upon the receiving of the confirmation.

43. The non-transitory computer-readable medium of claim 2, wherein the instructions direct the service computer device to perform the action of generating, on a periodic basis, a billing record including the subscription event and subsequent subscription events for the wireless device over a time period, and transmitting the billing record to the respective cellular wireless network carrier on the periodic basis.

44. The non-transitory computer-readable medium of claim 2, wherein the instructions direct the service computer device to perform the actions of:
communicating with a carrier-provided pre-pay service to authorize a download of the selected product or service if the user information identifies the wireless device as a pre-paid device; and
establishing the new subscription account corresponding to the wireless device for the subscription to the selected product or service if the user information identifies the wireless device as the pre-paid device and if the communicating results in receiving authorization for the download.

45. The non-transitory computer-readable medium of claim 2, wherein the subscription is caused to occur through an execution on the service computer device of an application comprising the selected product or service by the wireless device.

46. The service computer device of claim 3, wherein the service computer device is independent of the respective cellular wireless network carrier.

47. The service computer device of claim 3, further wherein the means for receiving is further configured for receiving confirmation of a successful download of the selected product or service from the wireless device, wherein transmitting the subscription event to the respective cellular wireless network carrier is dependent upon the receiving of the confirmation.

48. The service computer device of claim 3, further comprising means for generating, on a periodic basis, a billing record including the subscription event and subsequent subscription events for the wireless device over a time period, and wherein the means for transmitting is further configured for transmitting the billing record to the respective cellular wireless network carrier on the periodic basis.

49. The service computer device of claim 3, further comprising:
 means for communicating with a carrier-provided pre-pay service to authorize a download of the selected product or service if the user information identifies the wireless device as a pre-paid device; and
 wherein the means for establishing is further configured for establishing the new subscription account corresponding to the wireless device for the subscription to the selected product or service if the user information identifies the wireless device as the pre-paid device and if the communicating results in receiving authorization for the download.

50. The service computer device of claim 3, wherein the subscription is caused to occur through an execution on the service computer device of an application comprising the selected product or service by the wireless device.

51. The service computer device of claim 4, wherein the service computer device is independent of the respective cellular wireless network carrier.

52. The service computer device of claim 4, wherein the controller is further operable to receive confirmation of a successful download of the selected product or service from the wireless device, wherein transmitting the subscription event to the respective cellular wireless network carrier is dependent upon the receiving of the confirmation.

53. The service computer device of claim 4, wherein the controller is further operable to generate, on a periodic basis, a billing record including the subscription event and subsequent subscription events for the wireless device over a time period, and transmitting the billing record to the respective cellular wireless network carrier on the periodic basis.

54. The service computer device of claim 4, wherein the controller is further operable to:
 communicate with a carrier-provided pre-pay service to authorize a download of the selected product or service if the user information identifies the wireless device as a pre-paid device; and
 establish the new subscription account corresponding to the wireless device for the subscription to the selected product or service if the user information identifies the wireless device as the pre-paid device and if the communicating results in receiving authorization for the download.

55. The wireless device of claim 5, wherein the computer platform is further operable to transmit a confirmation of a successful download of the selected product or service, wherein the subscription is dependent upon the confirmation.

56. The method of claim 6, further comprising transmitting a confirmation of a successful download of the selected product or service, wherein the subscription is dependent upon the confirmation.

57. The method of claim 1, wherein the establishing further comprises establishing the new subscription account if the wireless device is determined, based on the user information, to correspond to the authorized subscriber account.

58. The method of claim 1, further comprising validating that the wireless device corresponds to an authorized subscriber account via a user authorization check with a carrier authorization service, and wherein the establishing further comprises establishing the new subscription account if the wireless device is determined, based on the user authorization check, to correspond to the authorized subscriber account.

59. The non-transitory computer-readable medium of claim 2, wherein the establishing further comprises establishing the new subscription account if the wireless device is determined, based on the user information, to correspond to the authorized subscriber account.

60. The non-transitory computer-readable medium of claim 2, further comprising validating that the wireless device corresponds to an authorized subscriber account via a user authorization check with a carrier authorization service, and wherein the establishing further comprises establishing the new subscription account if the wireless device is determined, based on the user authorization check, to correspond to the authorized subscriber account.

61. The service computer device of claim 3, wherein the means for establishing further comprises means for establishing the new subscription account if the wireless device is determined, based on the user information, to correspond to the authorized subscriber account.

62. The service computer device of claim 3, further comprising means for validating that the wireless device corresponds to an authorized subscriber account via a user authorization check with a carrier authorization service, and wherein the means for establishing further comprises means for establishing the new subscription account if the wireless device is determined, based on the user authorization check, to correspond to the authorized subscriber account.

63. The service computer device of claim 4, wherein the controller is further operable to establish the new subscription account if the wireless device is determined, based on the user information, to correspond to the authorized subscriber account.

64. The service computer device of claim 4, wherein the controller is further operable to validate that the wireless device corresponds to an authorized subscriber account via a user authorization check with a carrier authorization service, and wherein the controller is further operable to establish the new subscription account if the wireless device is determined, based on the user authorization check, to correspond to the authorized subscriber account.

65. The wireless device of claim 5, wherein the computer platform is further operable to receive the selected product or service if the wireless device is determined, based on the user information, to correspond to the authorized subscriber account.

66. The wireless device of claim 5, wherein the computer platform is further operable to receive the selected product or service if the wireless device is determined, based on a user authorization check with a carrier authorization service, to correspond to the authorized subscriber account.

67. The method of claim 6, wherein receiving the selected product or service further comprises receiving if the wireless device is determined, based on the user information, to correspond to the authorized subscriber account.

68. The method of claim 6, wherein receiving the selected product or service further comprises receiving if the wireless device is determined, based on a user authorization check with a carrier authorization service, to correspond to the authorized subscriber account.

69. The method of claim 1, further comprising:
arranging a method of payment for the selected product or service if the wireless device does not correspond to an authorized subscriber account of the respective cellular wireless network carrier.

70. The method of claim 9, wherein the communications network corresponds to a wireless network, the respective computer device corresponds to a wireless device and the respective service provider associated with the selected product or service corresponds to a cellular wireless network carrier.

71. The method of claim 9, wherein the coordinating includes setting up a service provider subscription to the respective service provider for the given computer device or the user of the given computer device if no such subscription is setup when the request for the selected product or service is received from the given computer device.

72. A service computer device that is configured to provide products and/or services to computer devices over a communications network, comprising:
means for transmitting a catalog to a given computer device over the communications network, wherein the catalog identifies at least one of a product or a service available from the service computer device, wherein each of the at least one of the product or service corresponds to an agreed-to price plan determined between a respective provider of the at least one of the product or service and a respective service provider;
means for receiving a request for a selected product or service from the given computer device, wherein the request comprises user information corresponding to the given computer device and identification of the selected product or service from the catalog;
means for determining whether the user information indicates that the given computer device or a user of the given computer device has a current subscription for access to the selected product or service;
means for coordinating, with the respective service provider associated with the selected product or service, to arrange for subscription registration and billing of the selected product or service by the respective service provider in response to the request if the given computer device or the user of the given computer device is determined not to have the current subscription; and
means for dispatching the selected product or service to the given computer device in response to the request (i) while bypassing the coordinating if the given computer device or the user of the given computer device is determined to have the current subscription, or (ii) in conjunction with the coordinating if the given computer device or the user of the given computer device is determined to not have the current subscription.

73. A server device that is configured to provide products and/or services to client devices, comprising:
means for transmitting a catalog, wherein the catalog identifies at least one of a product or a service available from the server device, wherein each of the at least one of the product or service corresponds to an agreed-to price plan between a respective provider of the at least one of the product or service and a respective service provider;
means for receiving a request for a selected product or service, wherein the request comprises user information corresponding to a given client device and identification of the selected product or service from the catalog;
means for determining whether the user information indicates that the given client device or a user of the given client device has a current subscription for access to the selected product or service;
means for arranging for subscription registration and billing of the selected product or service by the respective service provider in response to the request if the given client device or the user of the given client device is determined not to have the current subscription; and
means for dispatching the selected product or service to the given client device in response to the request (i) while bypassing the coordinating if the given client device or the user of the given client device is determined to have the current subscription, or (ii) in conjunction with the coordinating if the given client device or the user of the given client device is determined to not have the current subscription.

74. A service computer device that is configured to provide products and/or services to computer devices over a communications network, comprising:
a controller operable to:
transmit a catalog to a given computer device over the communications network, wherein the catalog identifies at least one of a product or a service available from the service computer device, wherein each of the at least one of the product or service corresponds to an agreed-to price plan determined between a respective provider of the at least one of the product or service and a respective service provider;
receive a request for a selected product or service from the given computer device, wherein the request comprises user information corresponding to the given computer device and identification of the selected product or service from the catalog;
determine whether the user information indicates that the given computer device or a user of the given computer device has a current subscription for access to the selected product or service;
coordinate, with the respective service provider associated with the selected product or service, to arrange for subscription registration and billing of the selected product or service by the respective service provider in response to the request if the given computer device or the user of the given computer device is determined not to have the current subscription; and
dispatch the selected product or service to the given computer device in response to the request (i) while bypassing the coordinating if the given computer device or the user of the given computer device is determined to have the current subscription, or (ii) in conjunction with the coordinating if the given computer device or the user of the given computer device is determined to not have the current subscription.

75. A server device that is configured to provide products and/or services to client devices, comprising:
a controller operable to:
transmit a catalog, wherein the catalog identifies at least one of a product or a service available from the server device, wherein each of the at least one of the product or service corresponds to an agreed-to price plan between a respective provider of the at least one of the product or service and a respective service provider;

receive a request for a selected product or service, wherein the request comprises user information corresponding to a given client device and identification of the selected product or service from the catalog;

determine whether the user information indicates that the given client device or a user of the given client device has a current subscription for access to the selected product or service;

arrange for subscription registration and billing of the selected product or service by the respective service provider in response to the request if the given client device or the user of the given client device is determined not to have the current subscription; and dispatch the selected product or service to the given client device in response to the request (i) while bypassing the coordinating if the given client device or the user of the given client device is determined to have the current subscription, or (ii) in conjunction with the coordinating if the given client device or the user of the given client device is determined to not have the current subscription.

76. A non-transitory computer-readable medium containing instructions stored thereon that when executed by a service computer device that is configured to provide products and/or services to computer devices over a communications network, directs the service computer device to perform the actions of:

transmitting a catalog to a given computer device over the communications network, wherein the catalog identifies at least one of a product or a service available from the service computer device, wherein each of the at least one of the product or service corresponds to an agreed-to price plan determined between a respective provider of the at least one of the product or service and a respective service provider;

receiving a request for a selected product or service from the given computer device, wherein the request comprises user information corresponding to the given computer device and identification of the selected product or service from the catalog;

determining whether the user information indicates that the given computer device or a user of the given computer device has a current subscription for access to the selected product or service;

coordinating, with the respective service provider associated with the selected product or service, to arrange for subscription registration and billing of the selected product or service by the respective service provider in response to the request if the given computer device or the user of the given computer device is determined not to have the current subscription; and dispatching the selected product or service to the given computer device in response to the request (i) while bypassing the coordinating if the given computer device or the user of the given computer device is determined to have the current subscription, or (ii) in conjunction with the coordinating if the given computer device or the user of the given computer device is determined to not have the current subscription.

77. A non-transitory computer-readable medium containing instructions stored thereon that when executed by a server device that is configured to provide products and/or services to client devices, directs the server device to perform the actions of:

transmitting a catalog, wherein the catalog identifies at least one of a product or a service available from the server device, wherein each of the at least one of the product or service corresponds to an agreed-to price plan between a respective provider of the at least one of the product or service and a respective service provider;

receiving a request for a selected product or service, wherein the request comprises user information corresponding to a given client device and identification of the selected product or service from the catalog;

determining whether the user information indicates that the given client device or a user of the given client device has a current subscription for access to the selected product or service;

arranging for subscription registration and billing of the selected product or service by the respective service provider in response to the request if the given client device or the user of the given client device is determined not to have the current subscription; and dispatching the selected product or service to the given client device in response to the request (i) while bypassing the coordinating if the given client device or the user of the given client device is determined to have the current subscription, or (ii) in conjunction with the coordinating if the given client device or the user of the given client device is determined to not have the current subscription.

* * * * *